United States Patent
Rosenberg et al.

(10) Patent No.: US 6,310,605 B1
(45) Date of Patent: *Oct. 30, 2001

(54) FORCE FEEDBACK INTERFACE WITH SELECTIVE DISTURBANCE FILTER

(75) Inventors: Louis B. Rosenberg, Pleasanton; Dean C. Chang, Mountain View, both of CA (US)

(73) Assignee: Immersion Corporation, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/370,948

(22) Filed: Aug. 9, 1999

Related U.S. Application Data

(63) Continuation of application No. 08/839,249, filed on Apr. 14, 1997, now Pat. No. 6,020,876.

(51) Int. Cl.[7] .................................................. G06F 3/033
(52) U.S. Cl. ........................................... 345/157; 345/161
(58) Field of Search .................................. 345/156, 157, 345/158, 161, 184; 463/30, 38; 244/223; 434/45; 318/568.1, 568.11

(56) References Cited

U.S. PATENT DOCUMENTS

| 3,919,691 | 11/1975 | Noll ................................. 340/172.5 |
| 4,398,889 | 8/1983 | Lam et al. .............................. 434/45 |

(List continued on next page.)

FOREIGN PATENT DOCUMENTS

0265011A1   4/1988   (EP) .
0626634 A2  11/1994  (EP) .

(List continued on next page.)

OTHER PUBLICATIONS

Gotow, J.K., et al., "Perception of Mechanical Properties at the Man–Machine Interface," IEEE 1987, pp. 688–689.

Atkinston, William D. et al, "Computing with Feeling," Comput. & Graphics, vol. 2, No. 2–E, pp. 97–103.

(List continued on next page.)

Primary Examiner—Jeffery Brier
(74) Attorney, Agent, or Firm—James R. Riegel

(57) ABSTRACT

A force feedback interface and method providing a selective disturbance filter for providing selective reduction or elimination of displayed disturbances associated with output force sensations. A force feedback interface device is connected to a host computer that displays a graphical environment. The interface device includes a user manipulatable object, a sensor for detecting movement of the user object, and an actuator to apply output forces to the user object. A microprocessor outputs controlling force signals to the actuator, receives sensor signals from the sensors and reports locative data to the host computer indicative of the movement of the user object. The host computer updates a position of a displayed user-controlled graphical object in the graphical environment based on the reported data. The microprocessor implements a selective disturbance filter for modifying the locative data reported to the host computer when the output force would cause a disturbance to the user-controlled graphical object, the disturbance occurring when an output force sensation affects the position of the user object such that the host computer would display the user controlled graphical object in an undesired location or with an undesired motion in the graphical environment.

43 Claims, 9 Drawing Sheets

U.S. PATENT DOCUMENTS

| | | | |
|---|---|---|---|
| 4,436,188 | 3/1984 | Jones | 188/378 |
| 4,477,043 | 10/1984 | Repperger | 244/223 |
| 4,632,341 | 12/1986 | Repperger et al. | 244/230 |
| 4,679,331 | 7/1987 | Koontz | 33/551 |
| 4,689,449 | 8/1987 | Rosen | 200/6 |
| 4,782,327 | 11/1988 | Kley et al. | 340/365 P |
| 4,800,721 | 1/1989 | Cemenska et al. | 60/393 |
| 4,803,413 | 2/1989 | Kendig et al. | 318/648 |
| 4,861,269 | 8/1989 | Meenen, Jr. | 434/45 |
| 4,868,549 | 9/1989 | Affinito et al. | 340/710 |
| 4,896,554 | 1/1990 | Culver | 74/471 XY |
| 4,897,582 | 1/1990 | Otten et al. | 318/135 |
| 5,007,300 | 4/1991 | Siva | 74/471 XY |
| 5,044,956 | 9/1991 | Behensky et al. | 434/45 |
| 5,062,594 | 11/1991 | Repperger | 244/175 |
| 5,065,145 | 11/1991 | Purcell | 340/706 |
| 5,076,517 | 12/1991 | Ferranti et al. | 244/228 |
| 5,088,055 | 2/1992 | Oyama | 364/560 |
| 5,103,404 | 4/1992 | McIntosh | 318/568.22 |
| 5,107,080 | 4/1992 | Rosen | 200/6 A |
| 5,107,262 | 4/1992 | Cadoz et al. | 341/22 |
| 5,116,051 | 5/1992 | Moncrief et al. | 273/448 B |
| 5,128,671 | 7/1992 | Thomas, Jr. | 341/20 |
| 5,143,505 | 9/1992 | Burdea et al. | 414/5 |
| 5,146,566 | 9/1992 | Hollis, Jr. et al. | 395/275 |
| 5,184,319 | 2/1993 | Kramer | 364/806 |
| 5,185,561 | 2/1993 | Good et al. | 318/432 |
| 5,186,629 | 2/1993 | Rohen | 434/114 |
| 5,193,963 | 3/1993 | McAffee et al. | 414/5 |
| 5,195,179 | 3/1993 | Tokunaga | 395/161 |
| 5,223,776 | 6/1993 | Radke et al. | 318/568.1 |
| 5,264,768 | 11/1993 | Gregory et al. | 318/561 |
| 5,296,871 | 3/1994 | Paley | 345/157 X |
| 5,298,890 | 3/1994 | Kanamaru et al. | 345/157 |
| 5,298,918 * | 3/1994 | Yen-Chen et al. | 345/163 |
| 5,354,162 | 10/1994 | Burdea et al. | 414/5 |
| 5,396,266 | 3/1995 | Brimhall | 345/161 |
| 5,405,152 | 4/1995 | Katanics et al. | 273/438 |
| 5,414,337 | 5/1995 | Schuler | 318/561 |
| 5,451,924 | 9/1995 | Massimino et al. | 340/407.1 |
| 5,512,919 | 4/1996 | Araki | 345/156 |
| 5,513,100 | 4/1996 | Parker et al. | 364/167 |
| 5,550,562 | 8/1996 | Aoki et al. | 345/163 |
| 5,565,887 | 10/1996 | McCambridge et al. | 345/145 |
| 5,570,111 | 10/1996 | Barrett et al. | 345/147 |
| 5,576,727 | 11/1996 | Rosenberg et al. | 345/161 |
| 5,589,828 | 12/1996 | Armstrong | 341/20 |
| 5,589,854 | 12/1996 | Tsai | 345/161 |
| 5,591,924 | 1/1997 | Hilton | 73/862.043 |
| 5,596,347 | 1/1997 | Robertson et al. | 345/145 |
| 5,623,582 | 4/1997 | Rosenberg | 395/99 |
| 5,625,576 | 4/1997 | Massie et al. | 364/578 |
| 5,629,594 | 5/1997 | Jacobus | 318/568.11 |
| 5,631,861 | 5/1997 | Kramer | 364/406 |
| 5,642,469 | 6/1997 | Hannaford et al. | 395/99 |
| 5,643,087 | 7/1997 | Marcus et al. | 463/38 |
| 5,656,901 | 8/1997 | Kurita | 318/436 |
| 5,666,138 | 9/1997 | Culver | 345/161 |
| 5,691,898 | 11/1997 | Rosenberg et al. | 364/190 |
| 5,701,140 | 12/1997 | Rosenberg et al. | 345/156 |
| 5,709,219 | 1/1998 | Chen et al. | 128/782 |
| 5,714,978 | 2/1998 | Yamanaka et al. | 345/157 |
| 5,721,566 | 2/1998 | Rosenberg et al. | 345/161 |
| 5,724,558 | 3/1998 | Svancarek et al. | 345/156 X |
| 5,731,804 | 3/1998 | Rosenberg | 345/156 |
| 5,734,373 | 3/1998 | Rosenberg et al. | 345/161 |
| 5,736,978 | 4/1998 | Haser et al. | 345/173 |
| 5,739,811 | 4/1998 | Rosenberg et al. | 345/161 |
| 5,742,278 * | 4/1998 | Chen et al. | 345/156 |
| 5,754,023 | 5/1998 | Roston et al. | 318/561 |
| 5,755,577 | 5/1998 | Gillio | 434/262 |
| 5,767,839 | 6/1998 | Rosenberg | 345/161 |
| 5,769,640 | 6/1998 | Jacobus et al. | 434/262 |
| 5,781,172 | 7/1998 | Engel et al. | 345/164 |
| 5,790,108 | 8/1998 | Salcudean et al. | 345/184 |
| 5,802,353 | 9/1998 | Avila et al. | 395/500 |
| 5,805,140 | 9/1998 | Rosenberg et al. | 345/161 |
| 5,808,601 | 9/1998 | Leah et al. | 345/145 |
| 5,825,308 | 10/1998 | Rosenberg | 341/20 |
| 5,844,392 | 12/1998 | Peurach et al. | 318/568.17 |
| 5,857,986 | 1/1999 | Moriyasu | 601/49 |
| 5,877,748 | 3/1999 | Redlich | 345/163 |
| 5,889,672 | 3/1999 | Schuler et al. | 364/188 |
| 5,914,705 | 6/1999 | Johnson et al. | 345/163 |
| 5,944,151 | 8/1999 | Jakobs et al. | 188/267.1 |
| 5,956,484 | 9/1999 | Rosenberg et al. | 395/200.33 |
| 5,959,613 | 9/1999 | Rosenberg et al. | 345/161 |
| 5,990,869 | 11/1999 | Kubica et al. | 345/163 |
| 5,999,168 | 12/1999 | Rosenberg et al. | 345/161 |
| 6,001,014 | 12/1999 | Ogata et al. | 463/37 |
| 6,004,134 | 12/1999 | Marcus et al. | 434/45 |
| 6,005,551 | 12/1999 | Osborne et al. | 345/161 |
| 6,028,593 | 2/2000 | Rosenberg et al. | 345/156 |
| 6,088,017 | 7/2000 | Tremblay et al. | 345/156 |
| 6,111,577 | 8/2000 | Zilles et al. | 345/355 |

FOREIGN PATENT DOCUMENTS

| | | |
|---|---|---|
| WO9502801 | 1/1995 | (WO) . |
| WO9520788 | 8/1995 | (WO) . |
| WO9532459 | 11/1995 | (WO) . |

OTHER PUBLICATIONS

Rosenberg, Louis B. et al., "Perceptual Decomposition of Virtual Haptic Surfaces," IEEE Symposium on Research Frontiers in Virtual Reality, Oct. 1993.

Jones, L.A., "A perceptual analysis of stiffness", Exp. Brain Research, 79:150–156, 1990.

Rosenberg et al., "Using Force Feedback to Enhance Human Performance in Graphical User Interfaces", www.acm.org/sigchi/chi96/proceedings, Apr. 1996.

Ramstein, Christophe, "Combining Haptic and Braille Technologies: Design Issues and Pilot Study", Assets '96, ACM SIGGAPH, 1996, pp. 37–44.

Payette et al., "Evaluation of a Force Feedback (Haptic) Computer Pointing Device in Zero Gravity," DSC—vol. 58, Proc. of the ASME Dynamics Systems and Control Div., ASME 1996, pp. 547–553.

Rosenberg, Louis, "The Use of Virtual Fixtures to Enhance Operator Performance in Time Delayed Teleoperation," Armstrong Lab., Crew Systems Directorate, 1993, pp. 1–45.

Ramstein et al., "The Pantograph: A Large Workspace Haptic Device for a Multimodal Human–Computer Interaction," Computer–Human Interaction, CHI '94.

Millman et al., "Design of a Four Degree–of–Freedom Force–Reflecting Manipulandum with a Specified Force/Torque Workspace", Proc. of 1991 IEEE Int'l Conf. on Robotics and Automation, IEEE, 1991, pp. 1488–1493.

Iwata, Hiroo, "Pen–based Haptic Virtual Environment", IEEE 0–7803–1363–1, 1993, pp. 287–292.

Ouh–young, Ming, "Using a Manipulator for Force Display in Molecular Docking," IEEE CH2555–1, 1988, pp. 1824–1829.

Winey III, Calvin, "Computer Simulated Visual and Tactile Feedback as an Aid to Manipulation and Vehicle Control," MIT, 1981, pp. 1–79.

Howe, Robert D. et al., "Task Performance with a Dextrous Teleoperated Hand System," Proceedings of SPIE, vol. 1833, 1992, pp. 1–9.

Kotoku, T. et al., "Environment Modeling for the Interactive Display used in Telerobotic Systems", IROS '91, IEEE Cat. No. 91Th0375–6, 1991, pp. 999–1004.

Batter et al., "Grope–1: A Computer Display to the Sense of Feel," Proc. IFIP Congress 1971, pp. 759–763.

Ouh–young, Ming, "Force Display in Molecular Docking," Univ. of North Carolina at Chapel Hill, 1990, pp. 1–12, 66–85.

Tan, H. et al., "Manual Resolution of Compliance when Work and Force Cues are Minimized," DSC—vol. 49, ASME 1993, pp. 99–104.

Russo, Massimo, "The Design and Implementation of a Three Degree–of–Freedom Force Output Joystick," 1990, pp. 1–40.

Rosenberg, Louis, "Virtual Haptic Overlays Enhance Performance in Telepresence Tasks," Stanford Univ., 1994.

Adachi, Y., et al., "Sensory Evaluation of Virtual Haptic Push–Buttons," Technical Research Center, Suzuki Motor Corp., 1994.

Su, Augustine et al., "The Virtual Panel Architecture: A 3D Gesture Framework" IEEE 4–7803–1363–1, 1993, pp. 388–393.

Buttolo, Pietro et al., "Pen–Based Force Display for Precision Manipulation in Virtual Environments," IEEE 0–8186–7084–3, 1995, pp. 217–224.

Ellis, R.E. et al., "Design and Evaluation of a High–Performance Prototype Planar Haptic Interface," DSC—vol. 49, ASME 1993, pp. 55–64.

Burdea, Grigore et al, "Distributed Virtual Force Feedback," IEEE Workshop on Force Display in Virtual Environments and its Application to Robotic Teleoperation, 1993, pp. 25–44.

Hasser, Christopher, "Tactile Feedback for a Force–Reflecting Haptic Display," Univ. of Dayton, 1995, pp. 1–65.

Rosenberg et al., "Commercially Viable Force Feedback Controller for Individuals with Neuromotor Disabilities," Armstrong Lab., Crew Systems Directorate, 1996, pp. 1–33.

Repperger, D.W., "Active Force Reflection Devices in Teleoperation," IEEE Control Systems, 0272–1708, 1991, pp. 52–55.

Akamatsu, M. et al., "Multimodal Mouse: A Mouse–Type Device with Tactile and Force Display," Presence vol. 3, Winter 1994, pp. 73–80.

Munch, Stefan et al., "Intelligent Control for Haptic Displays," Eurographics '96, vol. 15, No. 3, 1996, pp. C–217–C226.

Hannaford, B. et al., "Performance Evaluation of a Six–Axis Generalized Force–Reflecting Teleoperator," IEEE 0018–9472, 1991, pp. 620–623, 631–633.

Colgate et al., "Implementation of Stiff Virtual Walls in Force–Reflecting Interfaces," Northwestern Univ., IL, Sep. 22, 1993.

Adelstein et al., "Design and Implementation of a Force Reflecting Manipulandum," NASA Ames Research Center, 1992, pp. 1–24.

Minsky et al., "Feeling and Seeing: Issues in Force Display", Association for Computing Machinery, 1990, pp. 235–242.

Tan et al., "Human Factors for the Design of Force–Reflecting Haptic Interfaces," ASME WAM 1994, pp. 1–11.

Fischer et al., "Specification and Design of Input Devices for Teleoperation", IEEE Conference on Robotics, 1990, pp. 540–545.

Schmult et al., "Application Areas for a Force–Feedback Joystick", ASME 1993, pp. 47–54.

Hannaford, B. et al., "Force–Feedback Cursor Control," NASA Tech Brief, vol. 13, No. 11, Item #21, 1976, pp. 1–4.

Kelley, A.J. et al., "On the Development of a Force–Feedback Mouse and Its Integration into a Graphical User Interface," Symp. on Haptic Interfaces for Virtual Environment and Teleoperator Systems, 1994 Int'l Mech. Eng. Congress and Exhibition, 1994, pp. 1–8.

Rosenberg, "Perceptual Design of a Virtual Rigid Surface Contact", Center for Design Research, Stanford University, Armstrong Laboratory, Crew Systems Directorate, Apr. 1993, pp. 1–42.

Kelley, A.J. et al., "MagicMouse: Tactile and Kinesthetic Feedback in the Human Computer Interface using an Electromagnetically Actuated Input/Output Device," Dept. of Electrical Engineering, Univ. of British Columbia, 1993, pp. 1–27.

Kilpatrick, Paul, "The Use of a Kinesthetic Supplement in an Interactive Graphics System," Univ. of N. Carolina at Chapel Hill, Computer Science, 1976, pp. 1–175.

Hirota, K. et al., "Development of Surface Display," Dept. of Mechano–Informatics, Univ. of Tokyo, IEEE 0–7803–1363–1/93, pp. 256–262.

Iwata, H. et al., "Artificial Reality with Force–feedback: Development of Desktop Virtual Space with Compact Master Manipulator," Computer Graphics, vol. 24, No. 4, 1990, pp. 165–170.

Wiker, Steven et al., "Development of Tactile Mice for Blind Access to Computers: Importance of Stimulation Locus, Object Size, and Vibrotactile Display Resolution," Proc. of the Human Factors Society 35$^{th}$ Annual Meeting, 1991, pp. 708–712.

Ouh–young, "Creating an Illusion of Feel: Control Issues in Force Display," Computer Science Dept., Univ. of N. Carolina at Chapel Hill, 1989, pp. 1–14.

Hayward, Vincent et al., "Design and Multi–Objective Optimization of a Linkage for a Haptic Interface," Advances in Robot Kinematics and Computationed Geometry, 1994, pp. 359–368.

* cited by examiner

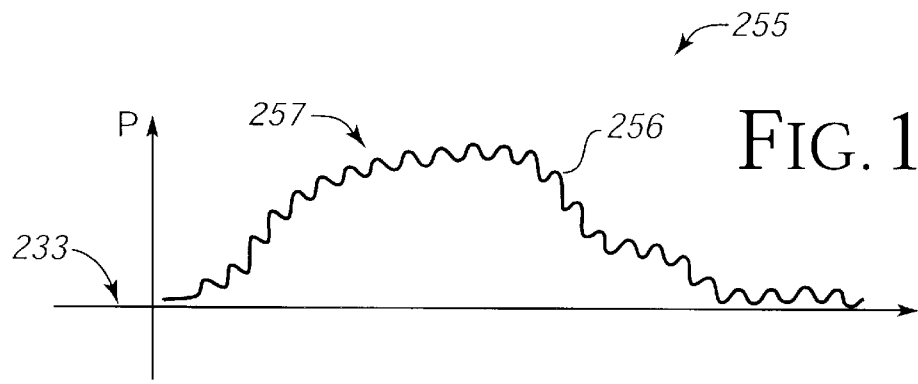
FIG. 12a
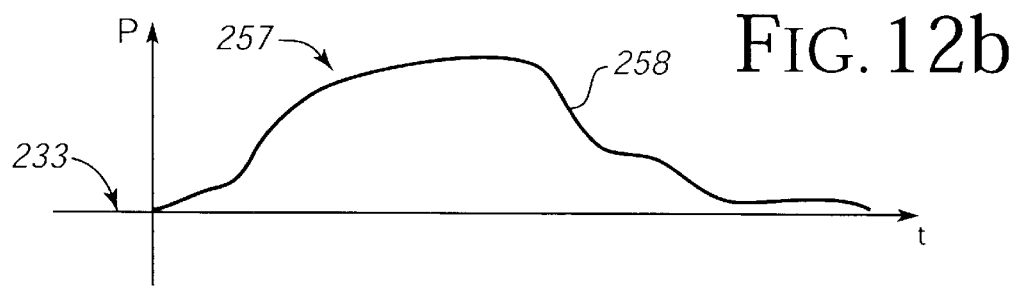
FIG. 12b
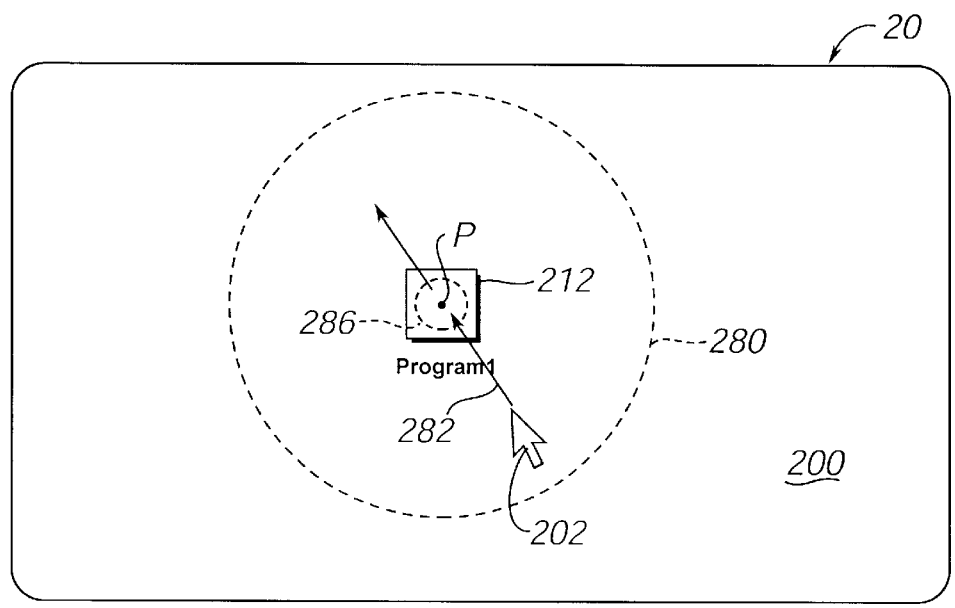
FIG. 16
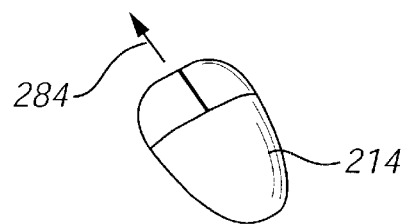

FORCE FEEDBACK INTERFACE WITH SELECTIVE DISTURBANCE FILTER

This is a continuation application of prior application Ser. No. 08/839,249 filed on Apr. 14, 1997, now U.S. Pat. No. 6,020,876, the disclosure of which is incorporated herein by reference.

BACKGROUND OF THE INVENTION

The present invention relates generally to interface devices for allowing humans to interface with computer systems, and more particularly to computer interface devices that allow the user to provide input to computer systems and allow computer systems to provide force feedback to the user.

Users interact with computer systems for a variety of reasons. A computer system typically displays a visual environment to a user on a display output device. Using an interface device, a user can interact with the displayed environment to perform functions and tasks on the computer, such as playing a game, experiencing a simulation or virtual reality environment, using a computer aided design system, operating a graphical user interface (GUI), or otherwise influencing events or images depicted on the screen. Common human-computer interface devices used for such interaction include a joystick, mouse, trackball, stylus, tablet, pressure-sensitive ball, or the like, that is connected to the computer system controlling the displayed environment. Typically, the computer updates the environment in response to the user's manipulation of a user-manipulatable physical object such as a joystick handle or mouse, and provides visual and audio feedback to the user utilizing the display screen and audio speakers. The computer senses the user's manipulation of the user object through sensors provided on the interface device that send locative signals to the computer. For example, the computer displays a cursor or other graphical object in a graphical environment, where the location of the cursor is responsive to the to the motion of the user object. The user can thus control the location of the cursor by moving the user object.

In some interface devices, tactile and/or haptic feedback is also provided to the user, more generally known as "force feedback." These types of interface devices can provide physical sensations which are felt by the user manipulating a user manipulable object of the interface device. For example, the Force-FX joystick controller from CH Products, Inc. and Immersion Corporation may be connected to a computer and provides forces to a user of the controller. Other systems might use a force feedback mouse controller. One or more motors or other actuators are coupled to the joystick and are connected to the controlling computer system. The computer system controls forces on the joystick in conjunction and coordinated with displayed events and interactions by sending control signals or commands to the actuators. The computer system can thus convey physical force sensations to the user in conjunction with other supplied feedback as the user is grasping or contacting the joystick or other object of the interface device. For example, when the user moves the manipulatable object and causes a displayed cursor to interact with a different displayed graphical object, the computer can issue a command that causes the actuator to output a force on the user object, conveying a feel sensation to the user.

The use of a user-controlled cursor in a graphical environment is well suited for use with force feedback. For example, a cursor that is moved into a displayed surface will be felt as a collision into a hard surface to the user because the actuator pushes back on the user object as the cursor is pushed against the displayed surface. Or, a user may move a cursor into a defined region on the graphical display and feel a vibration force on the user object as confirmation that the cursor is positioned within that region.

Other embodiments of force feedback systems do not involve control of a cursor. For example, a force feedback joystick can be used in video game applications, such as to fly a simulated aircraft. Sensors on the joystick allow the user to influence motion of the airplane, while actuators on the joystick allow the user to feel realistic force sensations. For example, the aircraft is flown into a simulated storm, where the host computer issues a force command that causes the actuators to create a feel of turbulence. This turbulence shakes the joystick in a convincing manner coordinated with the simulated storm.

A current problem with the prior art force feedback interfaces is that certain force sensations imposed by the actuator(s) on the user object cause a graphical object to move in undesired ways. For example, a vibration sensation imposed on a cursor control interface may cause the user object to shake. This, in turn, causes the cursor to shake or "jitter" on the screen because the cursor position is based on sensor readings describing the position of the user object. Such vibrations may cause the user difficulty in positioning the cursor at a desired position or "target" in the graphical user interface. Or, a turbulence sensation imposed on a joystick interface during a flight simulation game may cause the user object to shake, which in turn makes the airplane fly erratically since the airplane trajectory is based on locative signals derived from the position or motion of the user object. These undesired displayed effects can be referred to as "disturbances" due to their interfering effect on the position of a controlled graphical object or entity.

A different way to describe this problem is to view an actuated interface device as a user manipulatable object interfaced to a host computer through both input and output channels. The input channel transmits the locative data from the interface device to the host computer, where the data is used by the host to position simulated objects. The output channel transmits the force feedback sensations imposed on the user manipulatable object in response to host commands. Because the force feedback sensations (output) can disturb the user object and therefore disturb the sensor readings (input), the input and output channels are coupled. This coupling causes the problems outlined above, such as hindering a user's ability to accurately control a cursor or play a video game using the interface device.

SUMMARY OF THE INVENTION

The present invention is directed to a force feedback interface which provides a selective disturbance filter for providing selective reduction or elimination of displayed disturbances associated with certain output force sensations.

More specifically, the present invention relates to a force feedback interface device that implements a selective disturbance filter for reporting filtered data to a host computer system. which implements and displays a graphical environment. The interface device includes a user manipulatable object contacted by a user and movable in physical space in a degree of freedom, such as a mouse or joystick. A sensor detects the movement of the user object in the degree of freedom and outputs sensor signals representative of the movement. An actuator applies output forces in the degree of freedom of the user object as controlled by force signals.

A microprocessor, separate from the host computer, receives host commands from the host computer and outputs the force signals to the actuator for controlling the output force. The microprocessor also receives the sensor signals from the sensors and reports locative data to the host computer derived from the sensor signals and indicative of the movement of the user manipulatable object. The host computer updates a position of a displayed user-controlled graphical object based on at least a portion of this reported locative data. The microprocessor also implements a selective disturbance filter of the present invention for modifying the locative data reported to the host computer when the output force would cause a disturbance to the user-controlled graphical object.

A "disturbance" occurs when input and output are tightly coupled so that an output force sensation affects the position of the user object such that the host computer would display the user controlled graphical object in an undesired location or with an undesired motion in the graphical environment. In some embodiments, the user controlled graphical object is a cursor in a graphical user interface, while in other embodiments the user controlled graphical object is a simulated vehicle or entity in a graphical video game or the like. Different types of force sensations lead to disturbances, including a periodic force, an impulse force, and a snap force. The periodic force can cause a vibration of the user object that causes a cursor to vibrate. The impulse force can be a jolt that causes cursor to suddenly move in a direction corresponding to the jolt. The snap force can be an attraction force associated with a graphical target that causes a cursor to overshoot the target. The selective disturbance filter is preferably associated with at least one force or force sensation controlled by the microprocessor, such that the disturbance filter modifies the reported locative data when the associated force sensation is output by the actuator, thus reducing or eliminating the disturbance. At least one of multiple different types of force sensations can be commanded by the host computer by providing a host command to the microprocessor. The selective disturbance filter can be enabled, disabled, or characterized in the preferred embodiment with one or more of these host commands.

The modifying or "filtering" of the locative data is performed when the output force sensation is associated with the selective disturbance filter that is active/enabled. At least one of multiple available selective disturbance filters may be used to filter the reported data. Different types of selective disturbance filters are described herein, including a time filter, a sample and hold filter, and a spatial filter. The time filter can be used for periodic force sensations and may either sample the locative data at a sampling rate or time-average the locative data and report the averaged data to the host computer. The sample and hold filter can be used for impulse forces and may store a data value derived from the locative data before the force sensation is output, and report the stored data value during the output of the force sensation. The spatial filter can be used for snap forces and can store a data value representing a last position of the user object before the user object is moved out of a predetermined region in the graphical environment, where this last position is reported to the host computer to prevent an overshoot disturbance.

In another aspect of the present invention, a method for selectively filtering force disturbances occurring in a force feedback system includes steps of receiving a command at a force feedback interface device from a host computer to output a force sensation on the user manipulatable object, and determining whether the force sensation is associated with a disturbance filter process. The method determines whether the associated disturbance filter process is enabled, and, if so, the input locative data from sensors is filtered according to the associated filter process. The filtered data is reported to the host computer which uses at least part of the filtered data to update a position of a user controlled graphical object in a graphical environment. One or more different disturbance filter processes may be commanded as described above and may be applied to a variety of force sensations.

The method and apparatus of the present invention advantageously provides a disturbance filter that selectively modifies data reported to the host computer when output forces on a user object would create a disturbance in the display of an associated user-controlled graphical object. This feature reduces or eliminates undesired displayed effects associated with force sensations, and allows the accurate control and positioning of the user-controlled object or entity in a graphical environment. In addition, the filter is selective, thus allowing reported data to be modified only when it is appropriate and reducing processing burdens on the force feedback device. The command structure for implementing the disturbance filters provides the host computer with a high degree of control over the filters.

These and other advantages of the present invention will become apparent to those skilled in the art upon a reading of the following specification of the invention and a study of the several figures of the drawing.

BRIEF DESCRIPTION OF THE DRAWINGS

FIGS. 12a–b are graphs illustrating a position waveform and a reported waveform derived filtered from the position waveform, in which a vibration force and a user-induced force have influenced the shape of the waveform;

FIG. 16 is a diagrammtic illustration of a display screen showing a graphical user interface (GUI) and an overshoot disturbance.

DETAILED DESCRIPTION OF PREFERRED EMBODIMENTS

Figure 1:
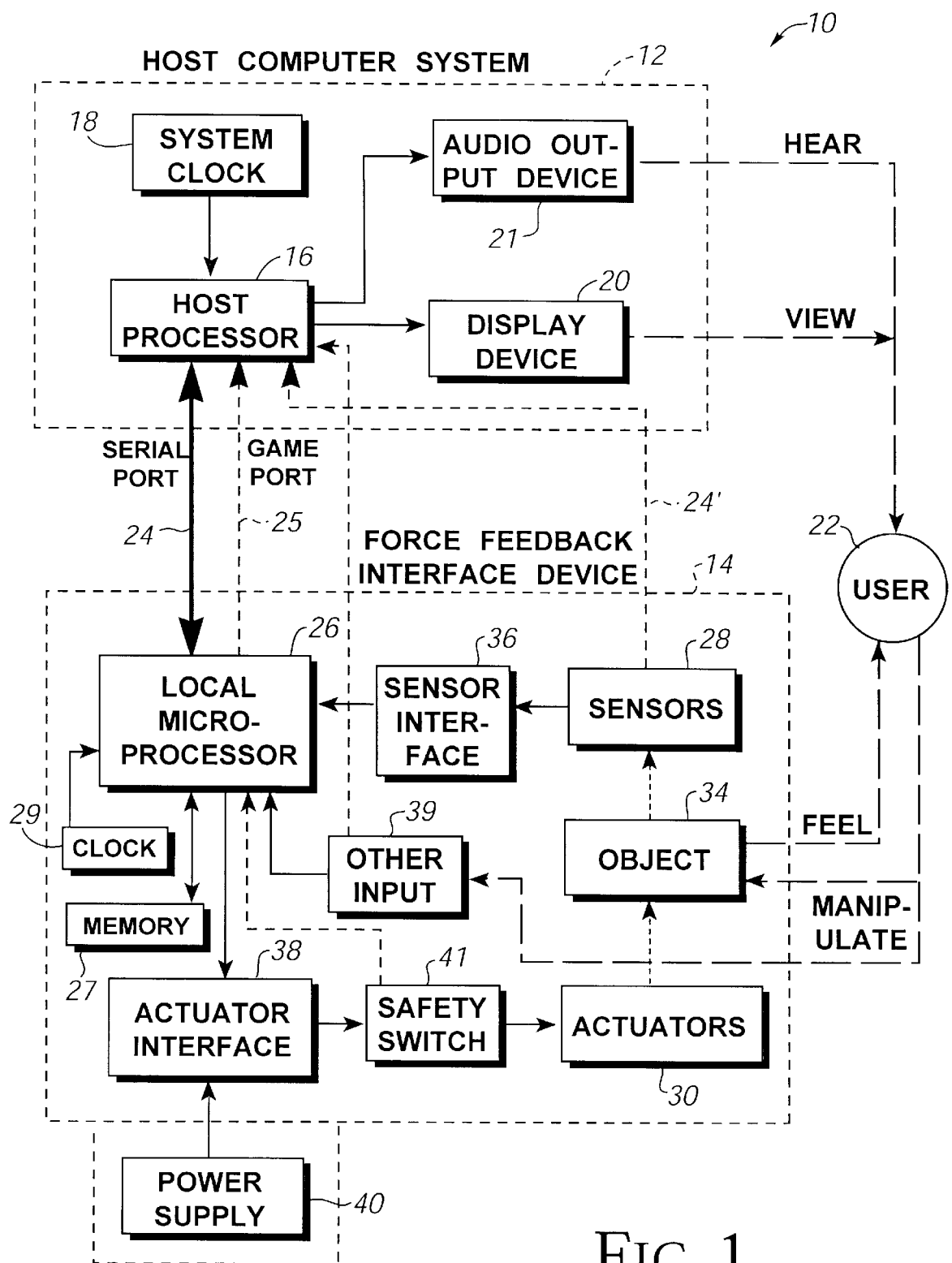
FIG. 1 is a block diagram of a system for controlling a force feedback interface device of the present invention.

FIG. 1 is a block diagram illustrating a force feedback interface system 10 of the present invention controlled by a host computer system. Interface system 10 includes a host computer system 12 and an interface device 14.

Host computer system 12 is preferably a personal computer, such as an IBM-compatible or Macintosh personal computer, or a workstation, such as a SUN or Silicon Graphics workstation. For example, the host computer system can a personal computer which operates under the MS-DOS or Windows operating systems in conformance with an IBM PC AT standard. Alternatively, host computer system 12 can be one of a variety of home video game systems commonly connected to a television set, such as systems available from Nintendo, Sega, or Sony. In other embodiments, home computer system 12 can be a television "set top box" or a "network computer" which can be used, for example, to provide interactive computer functions to users over networks.

In the described embodiment, host computer system 12 implements a host application program with which a user 22 is interacting via peripherals and interface device 14. For example, the host application program can be a video game, medical simulation, scientific analysis program, operating system, graphical user interface, or other application program that utilizes force feedback. Typically, the host application provides images to be displayed on a display output device, as described below, and/or other feedback, such as auditory signals.

Host computer system 12 preferably includes a host microprocessor 16, random access memory (RAM) (not shown), read-only memory (ROM) (not shown), input/output (I/O) electronics (not shown), a clock 18, a display screen 20, and an audio output device 21. Host microprocessor 16 can include a variety of available microprocessors from Intel, AMD, Motorola, or other manufacturers. Microprocessor 16 can be single microprocessor chip, or can include multiple primary and/or co-processors. Microprocessor preferably retrieves and stores instructions and other necessary data from RAM and ROM, as is well known to those skilled in the art. In the described embodiment, host computer system 12 can receive locative data or a sensor signal via a bus 24 from sensors of interface device 14 and other information. Microprocessor 16 can receive data from bus 24 using I/O electronics, and can use I/O electronics to control other peripheral devices. Host computer system 12 can also output a "force command" to interface device 14 via bus 24 to cause force feedback for the interface device.

Clock 18 is a standard clock crystal or equivalent component used by host computer system 12 to provide timing to electrical signals used by microprocessor 16 and other components of the computer system. Clock 18 is accessed by host computer system 12 in the force feedback control process, as described subsequently.

Display screen 20 is coupled to host microprocessor 16 by suitable display drivers and can be used to display images generated by host computer system 12 or other computer systems. Display screen 20 can be a standard display screen, CRT, flat-panel display, 3-D goggles, or any other visual interface. In a described embodiment, display screen 20 displays images of a simulation or game environment. In other embodiments, other images can be displayed. For example, images describing a point of view from a first-person perspective can be displayed, as in a virtual reality simulation or game. Or, images describing a third-person perspective of objects, backgrounds, etc. can be displayed. A user 22 of the host computer 12 and interface device 14 can receive visual feedback by viewing display screen 20.

Herein, computer 12 may be referred as displaying computer or graphical "objects" or "entities". These computer objects are not physical objects, but is a logical software unit collections of data and/or procedures that may be displayed as images by computer 12 on display screen 20, as is well known to those skilled in the art. For example, a cursor or a third-person view of a car might be considered player-controlled computer objects that can be moved across the screen. A displayed, simulated cockpit of an aircraft might also be considered. an "object", or the simulated aircraft can be considered a computer-implemented "entity".

Audio output device 21, such as speakers, is preferably coupled to host microprocessor 16 via amplifiers, filters, and other circuitry well known to those skilled in the art. Host processor 16 outputs signals to speakers 21 to provide sound output to user 22 when an "audio event" occurs during the implementation of the host application program. Other types of peripherals can also be coupled to host processor 16, such as storage devices (hard disk drive, CD ROM drive, floppy disk drive, etc.), printers, and other input and output devices.

An interface device 14 is coupled to host computer system 12 by a bi-directional bus 24. The bi-directional bus sends signals in either direction between host computer system 12 and the interface device. Herein, the term "bus" is intended to generically refer to an interface such as between host computer 12 and microprocessor 26 which typically includes one or more connecting wires, wireless connection, or other connections and that can be implemented in a variety of ways, as described below. In the preferred embodiment, bus 24 is a serial interface bus providing data according to a serial communication protocol. An interface port of host computer system 12, such as an RS232 serial interface port, connects bus 24 to host computer system 12. Other standard serial communication protocols can also be used in the serial interface and bus 24, such as RS-422, Universal Serial Bus (USB), MIDI, or other protocols well known to those skilled in the art. For example, the USB standard provides a relatively high speed serial interface that can provide force feedback signals in the present invention with a high degree of realism. USB can also source more power to drive peripheral devices. Since each device that accesses the USB is assigned a unique USB address by the host computer, this allows multiple devices to share the same bus. In addition, the USB standard includes timing data that is encoded along with differential data.

An advantage of the microprocessor-enabled local control of system 10 is that low-bandwidth serial communication signals can be used to interface with interface device 14, thus allowing a standard built-in serial interface of many computers to be used as bus 24. Alternatively, a parallel port of host computer system 12 can be coupled to a parallel bus 24 and communicate with interface device using a parallel protocol, such as SCSI or PC Parallel Printer Bus. Also, bus 24 can be connected directly to a data bus of host computer system 12 using, for example, a plug-in card and slot or other access of computer 12. Bus 24 can be implemented within a network such as the Internet or LAN; or, bus 24 can be a channel such as the air, etc. for wireless communication. In another embodiment, an additional bus 25 can be included to communicate between host computer system 12 and interface device 14. For example, bus 24 can be coupled to the standard serial port of host computer 12, while an additional bus 25 can be coupled to a second port of the host computer system, such as a "game port." The two buses 24 and 25 can be used simultaneously to provide a increased data bandwidth.

Interface device 14 includes a local microprocessor 26, sensors 28, actuators 30, a user object 34, optional sensor interface 36, an optional actuator interface 38, and other optional input devices 39. Interface device 14 may also include additional electronic components for communicating via standard protocols on bus 24. In the preferred embodiment, multiple interface devices 14 can be coupled to a single host computer system 12 through bus 24 (or multiple buses 24) so that multiple users can simultaneously interface with the host application program (in a multi-player game or simulation, for example). In addition, multiple players can interact in the host application program with multiple interface devices 14 using networked host computers 12, as is well known to those skilled in the art.

Local microprocessor 26 is coupled to bus 24 and is preferably included within the housing of interface device 14 to allow quick communication with other components of the interface device. Processor 26 is considered local to interface device 14, where "local" herein refers to processor 26 being a separate microprocessor from any processors in host computer system 12. "Local" also preferably refers to processor 26 being dedicated to force feedback and sensor I/O of interface device 14, and being closely coupled to sensors 28 and actuators 30, such as within the housing for interface device or in a housing coupled closely to interface device 14. Microprocessor 26 can be provided with software instructions to wait for commands or requests from computer host 16, decode the command or request, and handle/control input and output signals according to the command or request. In addition, processor 26 preferably operates independently of host computer 16 by reading sensor signals and calculating appropriate forces from those sensor signals, time signals, and stored or relayed instructions selected in accordance with a host command. Suitable microprocessors for use as local microprocessor 26 include the MC68HC711E9 by Motorola, the PIC16C74 by Microchip, and the 82930AX by Intel Corp., for example. Microprocessor 26 can include one microprocessor chip, or multiple processors and/or co-processor chips. In other embodiments, microprocessor 26 can include digital signal processor (DSP) capability.

Microprocessor 26 can receive signals from sensors 28 and provide signals to actuators 30 of the interface device 14 in accordance with instructions provided by host computer 12 over bus 24. For example, in a preferred local control embodiment, host computer system 12 provides high level supervisory commands to microprocessor 26 over bus 24, and microprocessor 26 manages low level force control loops to sensors and actuators in accordance with the high level commands and independently of the host computer 18. This operation is described in greater detail with respect to FIG. 4. Microprocessor 26 can also receive commands from any other input devices included on interface apparatus 14 and provides appropriate signals to host computer 12 to indicate that the input information has been received and any information included in the input information. For example, buttons, switches, dials, or other input controls 39 on interface device 14 or user object 34 can provide signals to microprocessor 26.

Local memory 27, such as RAM and/or ROM, is preferably coupled to microprocessor 26 in interface device 14 to store instructions for microprocessor 26 and store temporary and other data. In addition, a local clock 29 can be coupled to the microprocessor 26 to provide timing data, similar to system clock 18 of host computer 12; the timing data might be required, for example, to compute forces output by actuators 30 (e.g., forces dependent on calculated velocities or other time dependent factors). In embodiments using the USB communication interface, timing data for microprocessor 26 can be alternatively retrieved from the USB signal.

In the preferred embodiment, sensors 28, actuators 30, and microprocessor 26, and other related electronic components are included in a housing for interface device 14, to which user object 34 is directly or indirectly coupled. Alternatively, microprocessor 26 and/or other electronic components of interface device 14 can be provided in a separate housing from user object 34, sensors 28, and actuators 30. Also, additional mechanical structures may be included in interface device 14 to provide object 34 with desired degrees of freedom. Embodiments of a mechanism are described with reference to FIGS. 2a–b and 3.

Sensors 28 sense the position, motion, and/or other characteristics of a user object 34 of the interface device 14 along one or more degrees of freedom and provide signals to microprocessor 26 including information representative of those characteristics. Typically, a sensor 28 is provided for each degree of freedom along which object 34 can be moved. Alternatively, a single compound sensor can be used to sense position or movement in multiple degrees of freedom. An example of sensors suitable for several embodiments described herein are digital optical encoders, which sense the change in position of an object about a rotational axis and provide digital signals indicative of the change in position. A suitable optical encoder is the "Softpot" from U.S. Digital of Vancouver, Wash. Linear optical encoders, potentiometers, optical sensors, velocity sensors, acceleration sensors, strain gauge, or other types of sensors can also be used, and either relative or absolute sensors can be provided.

Sensors 28 provide an electrical signal to an optional sensor interface 36, which can be used to convert sensor signals to signals that can be interpreted by the microprocessor 26 and/or host computer system 12. For example, sensor interface 36 can receive two phase-related signals from a sensor 28 and converts the two signals into another pair of clock signals, which drive a bi-directional binary counter. The output of the binary counter is received by microprocessor 26 as a binary number representing the angular position of the encoded shaft. Such circuits, or equivalent circuits, are well known to those skilled in the art; for example, the Quadrature Chip LS7166 from Hewlett Packard, California performs the functions described above. If analog sensors 28 are used, an analog to digital converter (ADC) can convert the analog signal to a digital signal that is received and interpreted by microprocessor 26 and/or host computer system 12. Each sensor 28 can be provided with its own sensor interface, or one sensor interface may handle data from multiple sensors. Alternately, microprocessor 26 can perform the sensor interface functions. The position value signals can be used by microprocessor 26 and are also sent to host computer system 12 which updates the host application program and sends force control signals as appropriate. In alternate embodiments, sensor signals from sensors 28 can be provided directly to host computer system 12 as shown by bus 24', bypassing microprocessor 26.

Actuators 30 transmit forces to user object 34 of the interface device 14 in one or more directions along one or more degrees of freedom in response to signals received from microprocessor 26. Typically, an actuator 30 is provided for each degree of freedom along which forces are desired to be transmitted. Actuators 30 can include two types: active actuators and passive actuators. Active actuators include linear current control motors, stepper motors, pneumatic/hydraulic active actuators, a torquer (motor with limited angular range), a voice coil actuators, and other types of actuators that transmit a force to move an object. For example, active actuators can drive a rotational shaft about an axis in a rotary degree of freedom, or drive a linear shaft along a linear degree of freedom. Active transducers of the present invention are preferably bi-directional, meaning they can selectively transmit force along either direction of a degree of freedom. For example, DC servo motors can receive force control signals to control the direction and torque (force output) that is produced on a shaft. Passive actuators can also be used for actuators 30. Magnetic particle brakes, friction brakes, or pneumatic/hydraulic passive actuators can be used in addition to or instead of a motor to generate a damping resistance or friction in a degree of motion. In alternate embodiments, all or some of sensors 28 and actuators can be included together as a sensor/actuator pair transducer.

Actuator interface 38 can be optionally connected between actuators 30 and microprocessor 26. Interface 38 converts signals from microprocessor 26 into signals appropriate to drive actuators 30. Interface 38 can include power amplifiers, switches, digital to analog controllers (DACs), analog to digital controllers (ADC's), and other components, as is well known to those skilled in the art. In alternate embodiments, interface 38 circuitry can be provided within microprocessor 26, in actuators 30, or in host computer 12.

Other input devices 39 can optionally be included in interface device 14 and send input signals to microprocessor 26 or to host processor 16. Such input devices can include buttons, dials, switches, or other mechanisms. For example, in embodiments where user object 34 is a joystick, other input devices can include one or more buttons provided, for example, on the joystick handle or base and used to supplement the input from the user to a game or simulation. The operation of such input devices is well known to those skilled in the art.

Power supply 40 can optionally be coupled to actuator interface 38 and/or actuators 30 to provide electrical power. Power supply 40 can be included within the housing of interface device 14, or be provided as a separate component. Alternatively, if the USB or a similar communication protocol is used, interface device 14 can draw power from the USB and thus have no need for power supply 40. Also, power from the USB can be stored and regulated by interface device 14 and thus used when needed to drive actuators 30. For example, power can be stored over time in a capacitor or battery and then immediately dissipated to provide a jolt force to the user object 34.

Safety switch 41 is optionally included in interface device 14 to provide a mechanism to allow a user to deactivate actuators 30, or require a user to activate actuators 30, for safety reasons. In the preferred embodiment, the user must continually activate or close safety switch 41 during operation of interface device 14 to enable the actuators 30. If, at any time, the safety switch is deactivated (opened), power from power supply 40 is cut to actuators 30 (or the actuators are otherwise disabled) as long as the safety switch is opened. For example, one embodiment of safety switch is an optical switch located on user object 34 or on a convenient surface of a housing of interface device 14. The switch is closed when the user covers the optical switch with a hand or finger, so that the actuators 30 will function as long as the user covers the switch. Safety switch 41 can also provide a signal directly to host computer 12. Other types of safety switches 41 can be provided in other embodiments, such as an electrostatic contact switch, a button or trigger, a hand weight safety switch, etc. If the safety switch 41 is not provided, actuator interface 38 can be directly coupled to actuators 30.

User manipulable object 34 ("user object") is a physical object, device or article that may be grasped or otherwise contacted or controlled by a user and which is coupled to interface device 14. By "grasp", it is meant that users may releasably engage a grip portion of the object in some fashion, such as by hand, with their fingertips, or even orally in the case of handicapped persons. The user 22 can manipulate and move the object along provided degrees of freedom to interface with the host application program the user is viewing on display screen 20. Object 34 can be a joystick, mouse, trackball, stylus, steering wheel, sphere, medical instrument (laparoscope, catheter, etc.), pool cue, hand grip, knob, button, or other article.

Figure 2A:
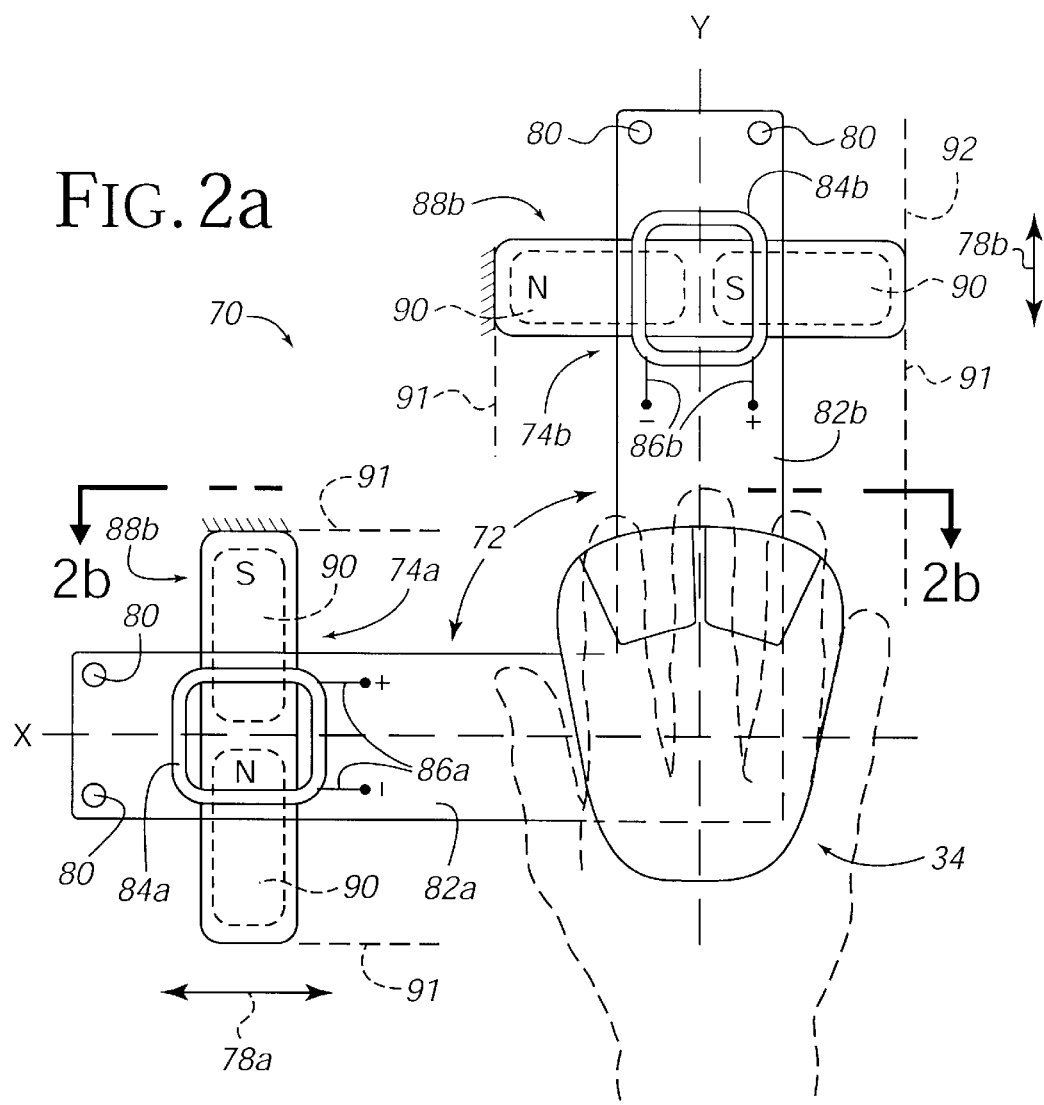
FIGS. 2a–b are top plan and side elevational views, respectively, of a first embodiment of a mechanism for interfacing a user manipulatable object with the force feedback device of FIG. 1.
Figure 2B:
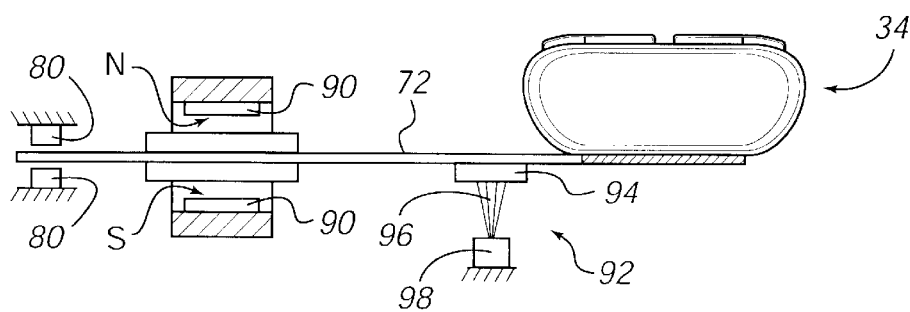

FIG. 2a is a top plan view and FIG. 2b is a side elevational view of one embodiment of an interface apparatus including a mechanical apparatus 70 and user object 34, in which electromagnetic voice coil actuators are used to provide forces to the user object. Such voice coil actuators are described in greater detail in U.S. Pat. No. 5,805,140, hereby incorporated by reference herein in its entirety. Interface apparatus 70 provides two linear degrees of freedom to user object 34 so that the user can translate object 34 in a planar workspace along the X axis, along the Y axis, or along both axes (diagonal movement). This embodiment is thus preferred for use with a mouse, puck, or similar user object 34 intended for such translatory motion. Apparatus 70 includes user object 34 and a board 72 that includes voice coil actuators 74a and 74b and guides 80.

Object 34 is rigidly coupled to board 72. In the described embodiment, board 72 is a circuit board, for example, and which may be etched with conductive materials. Board 72 is positioned in a plane substantially parallel to the X-Y plane and floats, i.e., board 72 is not grounded. Board 72 may thus be translated along axis X and/or axis Y, shown by arrows 78a and 78b, and object 34 is translated in the same directions, thus providing the object 34 with linear degrees of freedom. Board 72 is preferably guided by guides 80, which serve to keep board 72 substantially within a plane parallel to the X-Y plane and allow the board to translate in that plane, as shown by arrows 78a and 78b. Board 72 is provided in a substantially right-angle orientation having one extended portion 82a at 90 degrees from the other extended portion 82b.

Voice coil actuators 74a and 74b are positioned on board 72 such that one actuator 74a is provided on portion 82a and the other actuator 74b is provided on portion 82b. Wire coil 84a of actuator 74a is coupled to portion 82a of board 72 and includes at least two loops etched onto board 72 as a printed circuit board trace using well-known techniques. Terminals 86*a* are coupled to actuator drivers, so that host computer 12 or microprocessor 26 can control the direction and/or magnitude of the current in wire coil 84*a*. Voice coil actuator 74*a* also includes a magnet assembly 88*a*, which preferably includes four magnets 90 and is grounded. Each magnet has a polarity (north N or south S) on opposing sides of the magnet, such that coil 84*a* is positioned between opposing polarities on either side of the coil.

The magnetic fields from magnets 90 interact with a magnetic field produced from wire coil 84*a* when current is flowed in coil 84*a* to produce forces. Coil 84*a* and board 72 are positioned between magnets 90 and are thus affected by the magnetic fields of opposing magnets. As an electric current I is flowed through the coil 84*a* via electrical connections 86*a*, a magnetic field is generated from the current and configuration of coil 84*a*. The magnetic field from the coil then interacts with the magnetic fields generated by magnets 90 to produce a force along axis Y. The magnitude or strength of the force is dependent on the magnitude of the current that is applied to the coil, the number of loops in the coil, and the magnetic field strength of the magnets. The direction of the force depends on the direction of the current in the coil. By applying a desired current magnitude and direction, force can be applied to board 72, thereby applying force to user object 34 in the linear degree of freedom along axis Y. A voice coil actuator can be provided for each degree of freedom of the mechanical apparatus to which force is desired to be applied.

Thus, the magnetic fields from magnets 90 interact with the magnetic field produced from the current in wire coil 84*a* to produce a linear force to board 72 in a direction parallel to axis Y, as shown by arrow 78*b*. The board 72 and wire coil 84*a* are moved parallel to axis Y until coil 84*a* is moved out from under the magnet 90, as shown by limits 91. Physical stops can also be positioned at the edges of the board 72 to provide a movement limit. Voice coil actuator 74*b* operates similarly to actuator 74*a*. Alternatively, additional coils can also be provided for actuator 74*a* or 74*b* to provide different magnitudes of forces. For example, coil 84*a* can include multiple separate "sub-coils" of wire, where each sub-coil can provide a different number of loops on board 72 and therefore will generate a different magnetic field and thus a different magnitude of force when a constant current I is flowed through the sub-coil. In yet other embodiments, the translatory motion of board 72 along axes X and Y can be converted to two rotary degrees of freedom for user object 34 using a ball joint, pendulum, or other mechanism. In still other embodiments, additional degrees of freedom can be similarly provided with voice-coil actuation, such as an up-down degree of freedom along a z-axis.

Voice coil actuator 74*a* can also be used as a sensor to sense the velocity, position, and or acceleration of board 72 along axis Y. Motion of coil 84*a* along axis Y within the magnetic field of magnets 90 induces a voltage across the coil 84*a*, and this voltage can be sensed. This voltage is proportional to the velocity of the coil and board 72 along axis Y. From this derived velocity, acceleration or position of the board 72 can be derived. In other embodiments, separate digital sensors may be used to sense the position, motion, etc. of object 34 in low cost interface devices. For example, a lateral effect photo diode sensor 92 can be used, including a rectangular detector 94 positioned in a plane parallel to the X-Y plane onto which a beam of energy 96 is emitted from a grounded emitter 98. The position of the board 72 and object 34 can be determined by the location of the beam 96 on the detector.

Figure 3:
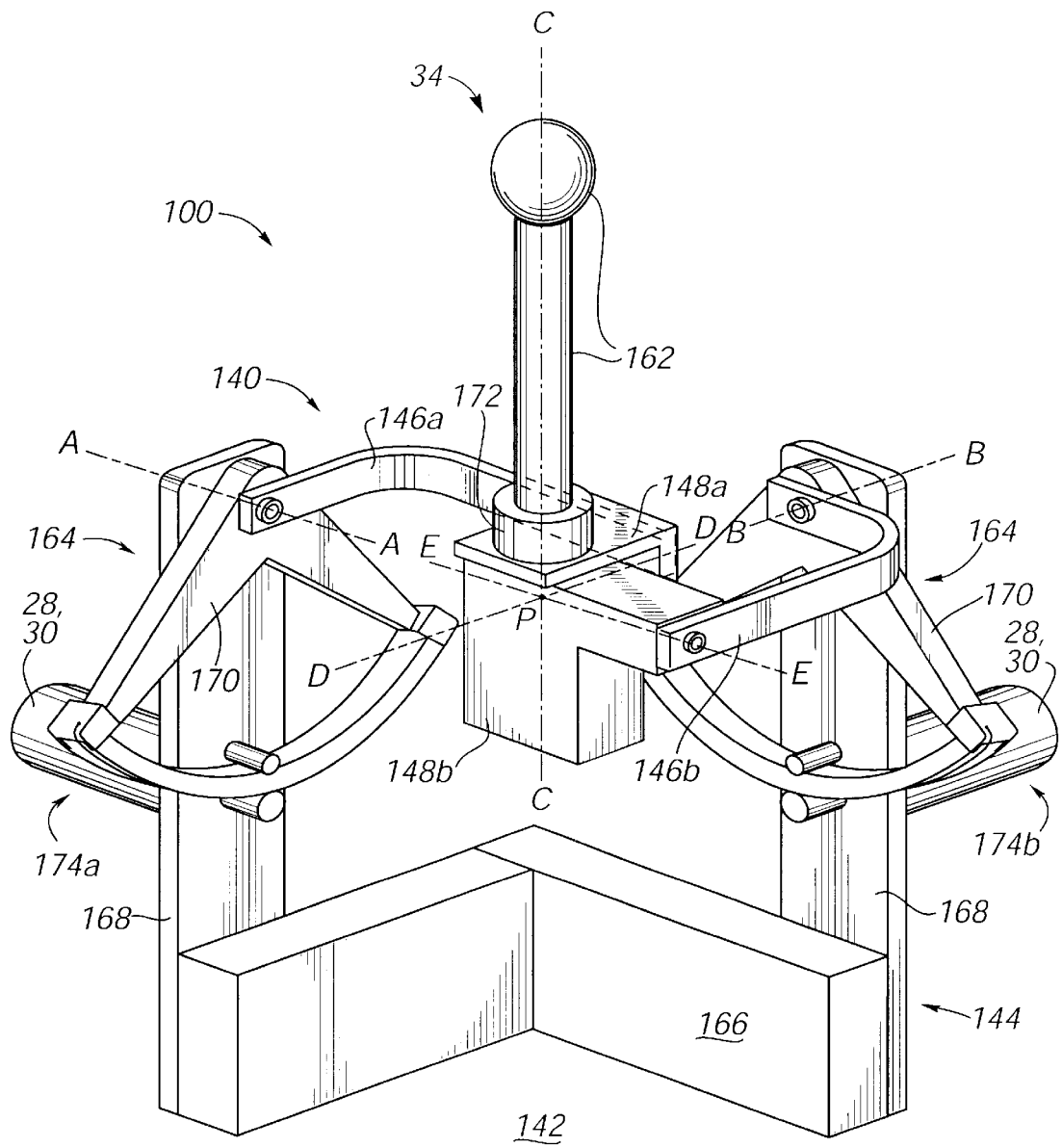
FIG. 3 is a perspective view of a second embodiment of a mechanism for interfacing a user manipulatable object with the force feedback device of FIG. 1.

FIG. 3 is a perspective view of another embodiment of a mechanical apparatus 100 suitable for providing mechanical input and output to host computer system 12. Apparatus 100 is more appropriate for a joystick or similar user object 34. Apparatus 100 includes gimbal mechanism 140, sensors 28 and actuators 30. User object 34 is shown in this embodiment as a joystick having a grip portion 162.

Gimbal mechanism 140 provides two rotary degrees of freedom to object 34. A gimbal device as shown in FIG. 2 is described in greater detail in U.S. Pat. Nos. 5,731,804 and 5,767,839, both hereby incorporated by reference in their entirety. Gimbal mechanism 140 provides support for apparatus 100 on grounded surface 142, such as a table top or similar surface. Gimbal mechanism 140 is a five-member linkage that includes a ground member 144, extension members 146*a* and 146*b*, and central members 148*a* and 148*b*. Gimbal mechanism 140 also includes capstan drive mechanisms 164.

Ground member 144 includes a base member 166 and vertical support members 168. Base member 166 is coupled to grounded surface 142. A vertical support member 168 is coupled to each of these outer surfaces of base member 166 such that vertical members 168 are in substantially 90-degree relation with each other. Ground member 144 is coupled to a base or surface which provides stability for mechanism 140. The members of gimbal mechanism 140 are rotatably coupled to one another through the use of bearings or pivots. Extension member 146*a* is rigidly coupled to a capstan drum 170 and is rotated about axis A as capstan drum 170 is rotated. Likewise, extension member 146*b* is rigidly coupled to the other capstan drum 170 and can be rotated about axis B. Central drive member 148*a* is rotatably coupled to extension member 146*a* and can rotate about floating axis D, and central link member 148*b* is rotatably coupled to an end of extension member 146*b* at a center point P and can rotate about floating axis E. Central drive member 148*a* and central link member 148*b* are rotatably coupled to each other at the center of rotation of the gimbal mechanism, which is the point of intersection P of axes A and B. Bearing 172 connects the two central members 148*a* and 148*b* together at the intersection point P.

Gimbal mechanism 140 is formed as a five member closed chain such that each end of one member is coupled to the end of a another member. Gimbal mechanism 140 provides two degrees of freedom to an object 34 positioned at or near to the center point P of rotation, where object 34 can be rotated about axis A and/or B. In alternate embodiments, object 34 can also be rotated or translated in other degrees of freedom, such as a linear degree of freedom along axis C or a rotary "spin" degree of freedom about axis C, and these additional degrees of freedom can be sensed and/or actuated. In addition, a capstan drive mechanism 164 can be coupled to each vertical member 168 to provide mechanical advantage without introducing friction and backlash to the system, and are described in greater detail in U.S. Pat. No. 5,767,839.

Sensors 28 and actuators 30 can be coupled to gimbal mechanism 140 at the link points between members of the apparatus, and can be combined in the same housing of a grounded transducer 174*a* or 174*b*. The housings of grounded transducers 174*a* and 174*b* are coupled to a vertical support member 168. A rotational shaft of actuator and sensor can be coupled to a pulley of capstan drive mechanism 164 to transmit input and output along the associated degree of freedom. User object 34 is shown as a joystick having a grip portion 162 for the user to grasp. A user can move the joystick about axes A and B. These two degrees of freedom can be sensed and actuated as described above. Optionally, other objects 34 can be coupled to gimbal mechanism 140, as described above.

Other embodiments of interface apparatuses and transducers can also be used in interface device 14 to provide mechanical input/output for user object 34. For example, interface apparatuses which provide one or more linear degrees of freedom to user object 34 can be used. In addition, passive actuators having an amount of "play" can be provided to implement different reflex processes. Other embodiments of actuators and interfaces are described in Ser. No. 08/571,606, and U.S. Pat. No. 6,024,576 and U.S. Pat. No. 5,767,839, U.S. Pat. No. 5,721,566, and U.S. Pat. No. 5,805,140, all hereby incorporated by reference herein.

Figure 4:
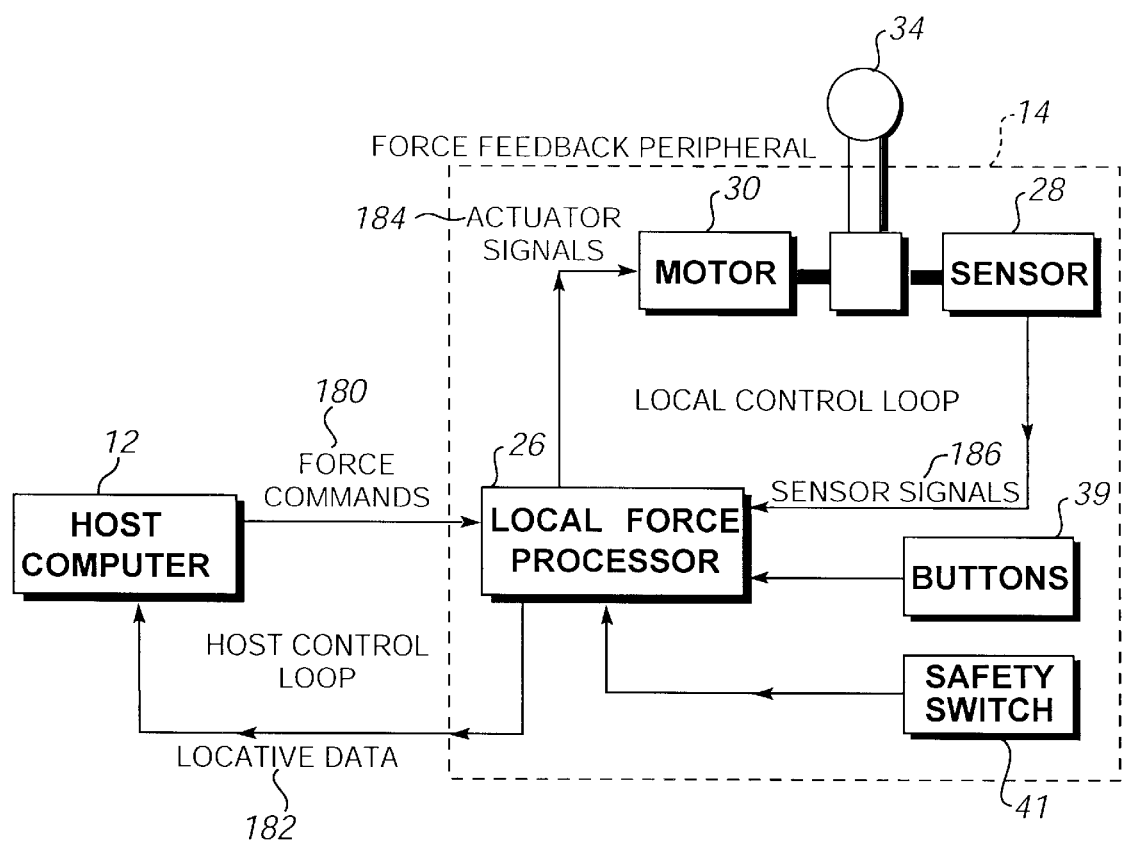
FIG. 4 is a block diagram illustrating a preferred functionality of the force feedback system of FIG. 1.

FIG. 4 is a block diagram illustrating the preferred functionality of the force feedback system 10 of FIG. 1. The force feedback system provides a host control loop of information and a local control loop of information.

In the host control loop of information, force commands 180 are provided from the host computer to the microprocessor 26 and reported data 182 is provided from the microprocessor 26 to the host computer. In one direction of the host control loop, force commands 180 are output from the host computer to microprocessor 26 and instruct the microprocessor to output a force having specified characteristics. Such characteristics may include the type of force desired, such as a vibration, texture, jolt, groove, obstruction, or other types of forces. Furthermore, the force commands may specify characteristics of the commanded force, such as magnitude, duration, frequency, conditions to cause the force to be applied, spatial range of force, etc. For example, in U.S. Pat. No. 5,734,373, a command protocol is disclosed in which a host command includes a command identifier, specifying the type of force, and one or more command parameters, specifying the characteristics of that type of force. In the preferred embodiment, the host computer can also provide other types of host commands to the microprocessor 26 besides force commands, e.g., commands to initiate and characterize the reading of sensor signals and the reporting of locative data derived from the sensor signals to the host computer from the microprocessor, commands to initiate and characterize the reading and reporting of button or other input device signals, etc.

The host computer 12 can also send commands to toad data from host computer 12 or another computer readable medium into memory 27 of the microprocessor for later use or to provide information needed for local force feedback determination. For example, the host computer 12 can send data including a "spatial representation" of objects in a graphical user interface to microprocessor 26, which is data describing the locations of all or some of the graphical objects currently displayed in the GUI which are associated with forces and the types of these graphical objects. The microprocessor can store such a spatial representation in memory 27. The microprocessor thus can determine, independently of the host computer, at what positions the user object is interacting with a graphical object having forces associated with it, and thus will know when to output force signals to actuators 30. In the preferred embodiment, only some of the graphical object locations are stored at one time in the limited storage space of the local memory 27, e.g., those graphical objects which are most likely to affect forces on the user object based on its current location. With this spatial representation, it is possible for microprocessor 26 to determine when the user object 34 moves within a region in the graphical environment, independently of the host computer determining when cursor 202 (see FIG. 5) is within the region in the graphical environment.

In the other direction of the host control loop, the local microprocessor 26 receives the host commands 180 and reports data 182 to the host computer. This data 182 preferably includes locative data (or sensor data) that describes the position of the user object 34 in one or more provided degrees of freedom. In some embodiments, other locative data can also be reported to the host computer, including velocity and/or acceleration data describing the motion of the user object 34. The data 182 can also include data describing the states of buttons 39 and/or the states/positions of other input devices 39 and safety switch 41. The host computer uses the data 182 to update programs executed by the host computer, such as a graphical simulation or environment, graphical user interface, video game, etc.

In the local control loop of information, actuator signals 184 are provided from the microprocessor 26 to actuators 30 and sensor signals 186 are provided from the sensors 28 and other input devices 39 to the microprocessor 26. In one direction, the actuator signals 184 are provided from the microprocessor 26 to the actuators 30 to command the actuators to output a force or force sensation. The microprocessor 26, for example, can output the control signals in the form of a force waveform which is transformed into the appropriate form for the actuators by an actuator interface 38. Herein, the term "force sensation" refers to either a single force or a sequence of forces output by the actuators 30 which provide a sensation to the user. For example, vibrations, attractive forces, a single jolt, or a force "groove" are all considered force sensations. The microprocessor 26 can process inputted sensor signals to determine appropriate output actuator signals by following instructions that may be stored in local memory 27 and includes force magnitudes, algorithms, or other data. The force process can command distinct force sensations, such as vibrations, textures, jolts, or even simulated interactions between displayed objects. These embodiments are described in greater detail in U.S. Pat. Nos. 5,739,811 and 5,734,373, both incorporated by reference herein.

In the other direction of the local control loop, the sensors 28 provide sensor signals 186 to the microprocessor 26 indicating a position (or other information) of the user object in degrees of freedom. Signals from other input devices 39 and safety switch 41 can also be input as sensor signals. The microprocessor may use the sensor signals in the local determination of forces to be output on the user object, as well as reporting locative data in data 182 derived from the sensor signals to the host computer that represents the position (or other characteristics) of the user object 34, as explained above. For example, the sensors signals may be processed into the locative data which is in a form suitable for reception by the host computer.

The data 182 reported to the host computer by the microprocessor 26 typically includes a direct representation of the position (or motion) of the user manipulatable object 34 (and/or may also represent the states/conditions of other input device 39). Thus, when the actuators 30 output a force on user object 34, the force moves the user object and changes its position. This new position is detected by the sensors and reported to the microprocessor in sensor signals 186, and the microprocessor in turn reports the new position to the host computer in data 182. The host computer updates an application program according to the newly-received position. Thus, the visual images updated on the screen may be affected by the force sensations, and vice-versa.

In an example, a player is using a force feedback steering wheel as user object 34 to drive a simulated race car around a track in a game. When the user pulls the wheel hard and causes the car to make a sharp turn, the host computer updates the simulation based on the sensor input from the wheel. The host computer determines that the car lost traction around the turn and skidded into the outer wall of the track. At the moment of impact, the host computer commands the force feedback device 14 to provide a force feedback sensation representative of this interaction. For example, a sharp jolt may be commanded. Thus, the physical output from the computer is dependent on the physical input from the user. The reverse is also true, for when the interface device hits the user with the sharp jolt, his or her hand is jarred away from the wall, causing the wheel to move and causing the input signals to change.

In the terminology used herein, the sensory inputs are "tightly coupled" to the force outputs of the force feedback system, i.e., the force sensations (the output) commanded by the host computer are highly dependent upon how the user manipulates the user object 34 (the input). Likewise, the manual gestures made by the user (the input) with the user object are affected by the force sensations commanded by the host computer (the output). This tight coupling is the very feature that allows force feedback to be a compelling interactive medium. However, this coupling can also be an impediment or "disturbance" that can corrupt game play (in video game embodiments) or hinder cursor targeting (in graphical user interface embodiments). Examples of these disturbances are described below.

To solve this impediment in the present invention, the microprocessor 26 may selectively decouple the input and output or modify/reduce the coupling by selectively filtering position changes of the user object caused by force disturbances. The microprocessor can filter the reported data by modifying the locative data that is reported to the host. The modification is based on the type of force sensation being output and other factors, and is described in greater detail below. This filtering can be highly effective because the force feedback device knows exactly what force sensations cause disturbances on the input and can tune the filtering process to exact instances in which a disturbance may occur. In addition, the filtering is preferably performed entirely by the microprocessor 26 such that the host computer 12 is completely ignorant of the filtering, i.e., the host only receives the reported data and does not know it was filtered. This allows all application programs of the host to be automatically compatible with the filtering processes described herein, since the application programs do not have to perform special filtering functionality of their own.

In a different, host-controlled embodiment that utilizes microprocessor 26, host computer 12 can provide low-level force commands over bus 24, which microprocessor 26 directly transmits to the actuators. In yet another alternate embodiment, no local microprocessor 26 is included in interface system 10, and host computer 12 directly controls and processes all signals to and from the interface device 14, e.g. the host computer directly controls the forces output by actuators 30 and directly receives sensor signals 186 from sensors 28 and input devices 39. In such host embodiments, the application program controlling the graphical environment need not have to perform the filtering. For example, a device driver program resident in the host computer's memory can perform the filtering functions attributed to the microprocessor 26 herein, thus allowing the application program to be completely ignorant of the filtering.

Figure 5:
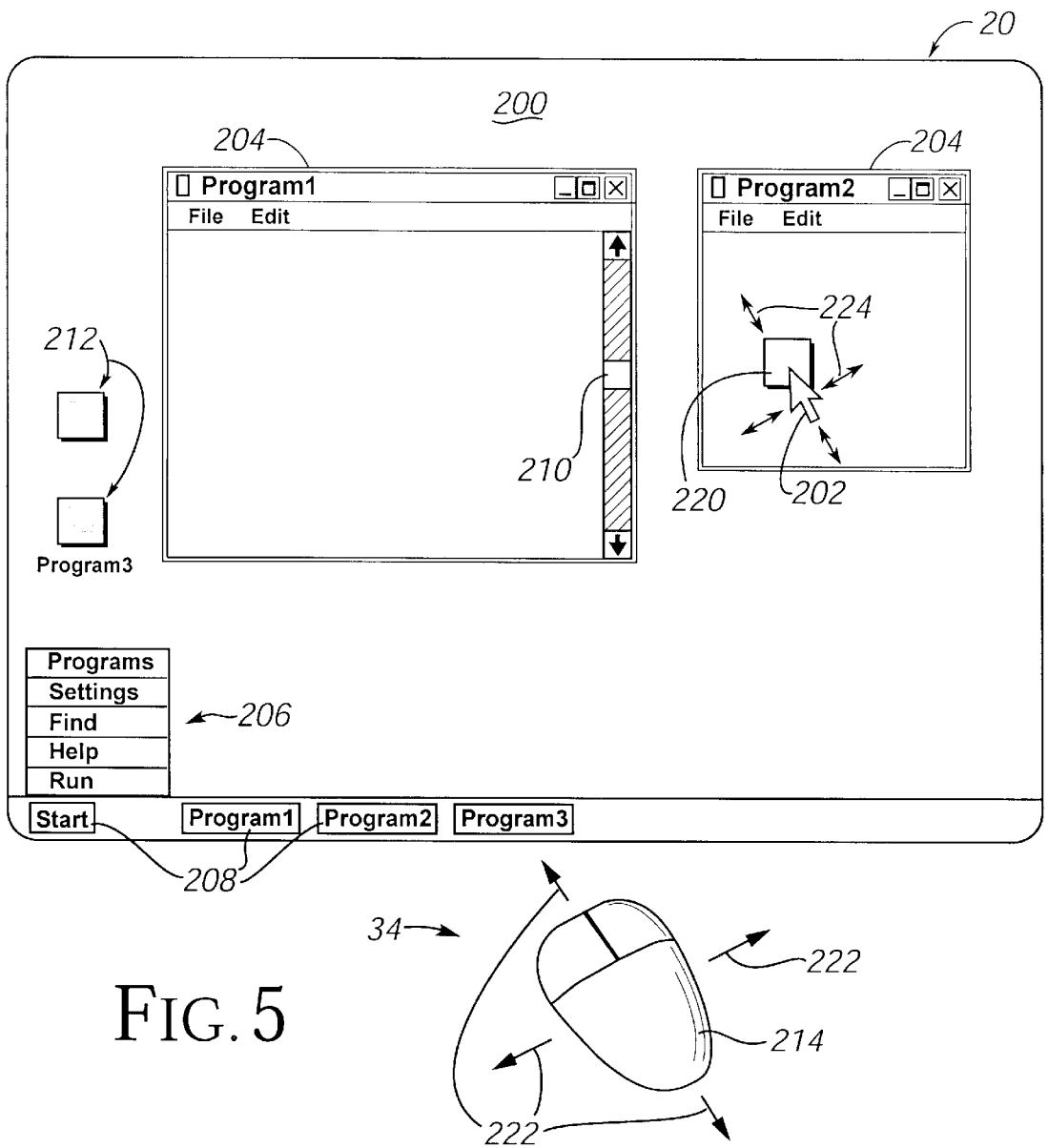
FIG. 5 is a diagrammatic illustration of a display screen showing a graphical user interface (GUI) and a vibration disturbance.

FIG. 5 is a diagrammatic illustration of a display screen 20 that is connected to or incorporated in host computer 12 for use in describing a periodic disturbance. Display screen 20 displays a graphical environment, which in this case is a graphical user interface (GUI) 200 for use with an operating system, such as Windows, MacOS, etc. GUI 200 includes several standard objects, such as user-controlled cursor 202 (also known as a user-controlled graphical object), windows 204, drop-down menu 206, graphical buttons 208, slider 210, and icons 212. A user object 34 in the described example is a mouse 214 that includes force feedback functionality as described above and is manipulated by a user to control cursor 202.

Cursor 202 is used to select different functions and features of the GUI 200. In most embodiments, the cursor 202 is controlled under a position control paradigm, i.e., the position of the cursor on display screen 20 (or in a sub-region of the display screen) is directly correlated to a position of user object 34 in a planar workspace. Cursor 202 may be used to select or move objects, execute programs, manipulate files, load a web page through an Internet link, or other functions in conjunction with a command from the user, typically input through the use of buttons 216 on the mouse 214. These functions are typically implemented through the use of the displayed objects such as window 204, drop-down menu 206, graphical buttons 208, slider 210, and icons 212, as is well known to those skilled in the art.

When using a mouse with force feedback functionality, different force sensations can be associated with different objects and/or functions in GUI 200. For example, certain objects such as icons 212 can have attractive or repulsive forces associated with them to attract or repulse cursor 202, where the user can feel such attractive or repulsive forces on user object 34. Slider 210 can have a "groove" force associated with it to help maintain the cursor 202/user object 34 in the slider. The graphical objects can also have a simulated mass, friction, and/or inertia associated with them to provide characteristic forces when the objects are selected or moved using cursor 202. Many types of forces associated with GUI graphical objects are described in greater detail in co-pending patent applications Ser. No. 08/571,606 and U.S. Pat. No. 5,825,308, both incorporated by reference herein.

Figure 6:
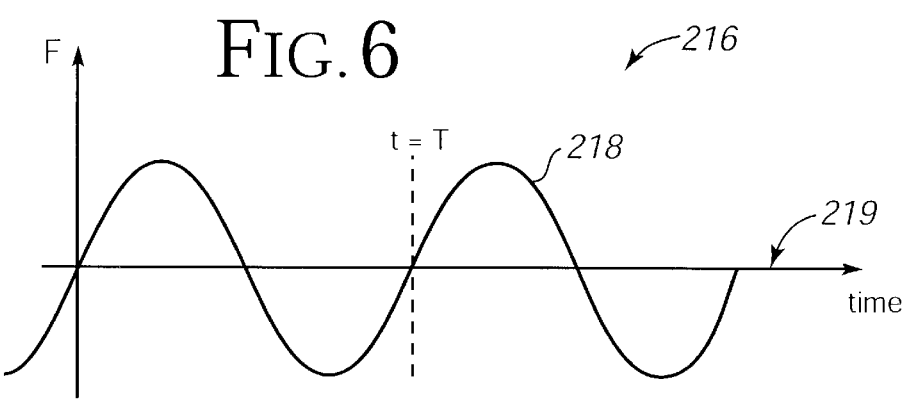
FIG. 6 is a graph showing a force waveform causing a periodic vibration on the user object.

Another force that can be associated with graphical objects is a periodic vibration force. This force provides a sensation of a pulsation on the user object 34. For example, FIG. 6 illustrates a graph 216 of a force waveform 218 used to control a vibration on user object 34 in a single degree of freedom. Force (F) output from an actuator 30 to the user object can vary according to a periodic sine wave 218, where the magnitude of the wave may vary above a baseline 219 and below the baseline 219. For example, the baseline can be an origin position of the user object between two directions in a degree of freedom. When the force waveform 218 is above the baseline 219, positive force magnitudes are provided in one direction in the degree of freedom, and when the waveform is below the baseline, negative force magnitudes are provided in the opposite direction in that degree of freedom. Alternatively, the baseline can be offset from the origin position, so that the oscillations do not change the direction of the force; e.g., the force can vary from a high magnitude to a magnitude close to zero. In other embodiments, a square wave, triangle wave, or other shape of waveform 218 can be used to provide the vibration. Similar vibration forces can be provided in multiple degrees of freedom of the user object 34.

Referring back to FIG. 5, a vibration force can be associated with objects, regions, or functions in GUI 200. For example, a vibration force can be associated with icon 220 in window 204 such that the user object 34 vibrates whenever the cursor 202 is over the icon 220. Such a vibration can function to inform the user when the cursor is in a position to select the icon, thus assisting the user in positioning the cursor accurately on the icon when desired. When the cursor is in such a position, microprocessor 26 causes mouse 214 to vibrate in one or more degrees of freedom, as represented by arrows 222. For example, the microprocessor can be instructed by a force routine resident in local memory to vibrate the mouse according to a magnitude and frequency specified by default parameters or by a previously-transmitted host command, or by a host command received from host computer 12 in real time.

When mouse 214 is so vibrated, however, the cursor 202 is also vibrated when the selective disturbance filter of the present invention is not used. This is due to the sensors 28 sensing the position changes of the user object 34 during the vibration and microprocessor 26 sending those position changes to host computer 12. The host computer 12 updates the position of the cursor in accordance with the position changes, thus causing the cursor 202 to vibrate on display screen 20, as represented by arrows 224.

The vibration of cursor 202 is one of several types of interference effects referred to herein as "disturbances", since these effects can be disconcerting for the user. Significantly, the vibration of cursor may actually cause less accuracy in positioning the cursor 202 over icon 224 since the vibration motions throw the cursor in different directions away from the icon. The selective disturbance filter of the present invention allows the user object 34 to be vibrated and thus inform/assist the user of the layout of GUI 200 as intended while preventing or reducing the vibration of the cursor 202 on the display screen, thus reducing or eliminating the visual disturbance to the user.

Other types of forces tending to cause force disturbances to users include impulse forces, such as jolts, and "snap" forces, such as attractive or spring forces. An impulse force is a large spike that may occur, for example, when the host computer sends a jolt command to inform the user of an event or spatial feature. A snap force such as an attractive force, for example, causes the user object to move toward a point or object, similar to a gravitational force, and may be applied when the user object or cursor moves within a predetermined range of an object. These forces are described in greater detail below.

Visual vibration and other types of disturbances can also occur in other graphical environments. For example, in a flight simulation video game, a simulated storm might cause a simulated controlled aircraft to experience wind and turbulence forces. These forces can be simulated by applying a vibration or jolts to the user object. However, such forces will cause the user object to move, and this movement is reported to the host computer. The result is that the cockpit view of the aircraft vibrates or jolts in an undesired fashion: a disturbance. Similarly, a first-person shooting action game may apply jolts to the user object when the player's gun is fired to simulate a recoil. However, this jolt will disturb the aim of the player's gun when the position of the user object is affected by the jolt. In many embodiments, this disturbance is not desired in game play.

Force Disturbance Filters

The present invention alleviates the disturbance problems discussed above by implementing one or more "disturbance filters." This type of filter modifies or omits data representing position or motion of the user object that normally would be reported to the host computer 12 by the microprocessor 26. Instead of always reporting exact changes in position or motion of the user object 34 to the host computer, the microprocessor uses the disturbance filters to selectively alter the reported data when a disturbance is determined to have occurred or to imminently occur. Intentionally, the host computer thus will not display the user-controlled graphical object in precise correlation with motions of the user manipulatable object 34. The filter minimizes the effect of the disturbance and decouples (or reduces the coupling of) the input and output, thereby allowing an effective force sensation to be imparted to the user while still permitting accurate control of a user-controlled graphical or simulated object.

Since the host computer is not displaying a user-controlled object in correlation with the position of the user object, a dichotomy is created between what is felt and what is visually perceived by the user, i.e., a break in the mapping between the position of the user object and the position of the controlled graphical object occurs: a decoupling of the input and outputs, as described above. This dichotomy between physical and visual experiences can be utilized to provide an illusion that no visual disturbance has occurred. Since users are greatly influenced by what they perceive visually, the user often does not notice that small deviations of his or her hand or other physical member in physical space does not exactly correlate with a corresponding visual component. A dichotomy related to this is described in detail in U.S. Pat. No. 6,028,593, which is hereby incorporated by reference herein. However, the dichotomy in the previous application dealt with "fooling" the user into believing that no movement of the physical object 34 was taking place by not moving the graphical object. Herein, it is desired for the user to feel and realize he or she is feeling a force sensation, but to reduce a visual disturbance associated with the sensation.

The microprocessor 26 preferably applies a disturbance filter of the present invention when conditions are appropriate. This aspect is described below with respect to FIG. 16. For example, the microprocessor can be instructed previously (e.g. with host commands) to check for types of forces and conditions in which it is necessary to apply disturbance filters. This feature allows the disturbance filters of the present invention to be "selective," i.e., the filters are not always applied to all locative data, but are applied only to certain desired types of locative data resulting from specified types of force sensations on user object 34.

In some embodiments, locative data need only be filtered (modified) in only some directions and/or degrees of freedom of user object 34. For example, if a vibration is occurring only about the x-axis of a joystick, then the locative data from the y-axis need not be modified by a filter.

Figure 14:
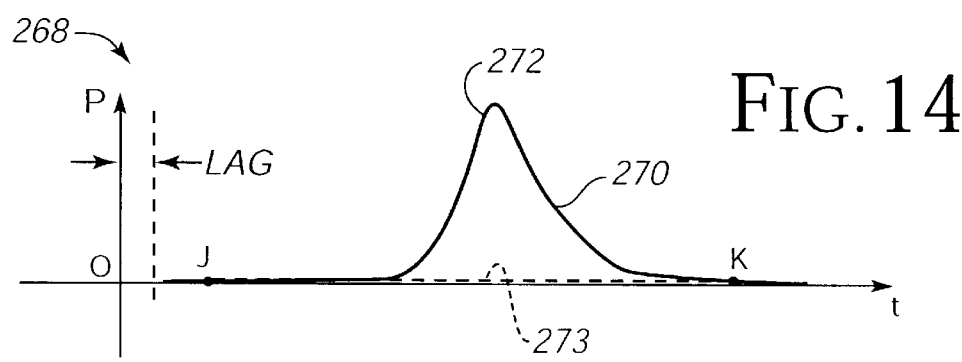
FIG. 14 is a graph showing a reported position waveform filtered from the impulse waveform of FIG. 12 using a sample and hold filtering method of the present invention.
Figure 15:
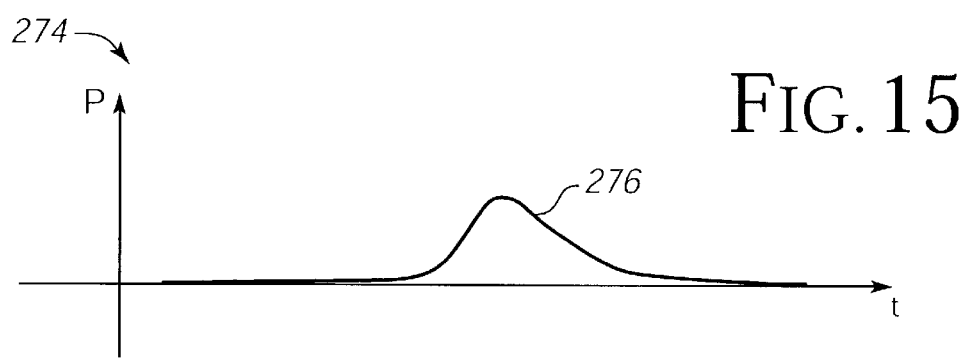
FIG. 15 is a graph showing a reported position waveform filtered from the impulse waveform of FIG. 12 using an averaging filtering method of the present invention.

There are three types of disturbance filters discussed in the embodiments herein: a time disturbance filter (discussed with respect to FIGS. 7–11), a sample-and-hold disturbance filter (discussed with respect to FIGS. 12–14), and a spatial disturbance filter (discussed with respect to FIG. 15). The filters and methods disclosed herein may be implemented using software (e.g., "program instructions"), hardware (e.g., logic and related components), or a combination of software and hardware.

Figure 7:
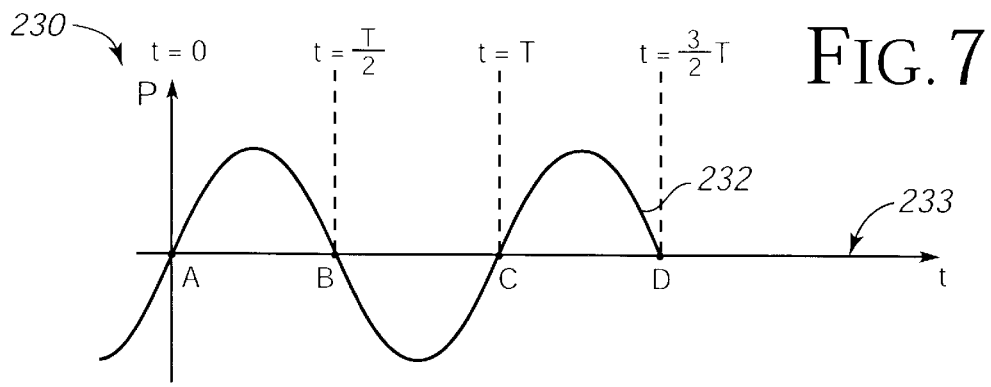
FIG. 7 is a graph showing a position waveform sensed by the sensors during the vibration force of FIG. 6 and a first sampling filtering method of the present invention.

FIG. 7 is a graph 230 illustrating locative data that is sensed by sensors 28 in response to a force vibration waveform, and to which a time disturbance filter of the present invention is applied. As described above, the data is shown as a sine waveform 232, but can also be a triangle wave, square wave, or other shaped waveform having a periodic oscillation of sensed positions. The waveform 232 describes oscillating positions (P) of the user object 34 in a degree of freedom over time (t) as sensed by sensors 28 and reported to/processed by the microprocessor 26 with reference to a baseline 233. As described above with reference to FIG. 6, the baseline can be an origin position of the user object, or be offset from the origin. For example, positive positions can be considered in one direction in the degree of freedom, negative positions can be in the opposite direction in the degree of freedom, and the baseline 233 is the origin position in the degree of freedom. The waveform 232 has a frequency determined by the period T of waveform 232. In this example, the oscillating positions of the user object in waveform 232 are caused by the force vibration waveform 218 of FIG. 6 which is output on the user object from actuators 30. The force waveform 218 has a sine-wave-shaped force vs. time profile with substantially the same frequency as waveform 232 for the purposes of this example. It should be noted that the sensed waveform as shown assumes that the user is not substantially interfering with the position of the user object by opposing the vibration forces output by the actuator 30. A waveform showing an example of user influence on the user object position is described below with reference to FIG. 12a.

To minimize the effect of a periodic force disturbance (output) on the data reported to the host computer (input), the sensed waveform 232 can be filtered over time. This will suppress many of the undesired oscillations that would otherwise be reported to the host computer and thus minimizes the vibration or oscillation of the user-controlled graphical object on the display.

An ideal filtering of the vibration disturbance over time is illustrated in FIG. 7. In this ideal system, the microprocessor begins sampling at point A of sensed waveform 232 at the same time it initially sends out the force waveform 218 to the actuators 30. Using a filter having a sampling time of t=T/2, the data points A, B, C, and D of the waveform 232 are sampled by the microprocessor 26 and only these points are reported to the host computer 12. Thus, the host computer receives what appears to be positions of the user object that are unchanging and constant at baseline 233. The host computer accordingly displays the cursor 202 (or other graphical object/entity) at a constant, unchanging position on display screen 20 (which is the position of the graphical object before the vibration occurs). Thus, although the user object 34 is vibrated according to force waveform 218, the position of the cursor is updated only according to points A, B, C, D on waveform 232, such that the cursor does not move. This effectively filters the visual disturbance of the cursor 202 by allowing accurate positioning of the cursor over a graphical object or region while also allowing force feedback to inform the user of the cursor's position/interaction in the graphical environment.

In practice, there is a time lag between the output of the force waveform 218 by the microprocessor and the input of the waveform 232 to the microprocessor from sensors 28. This time lag is caused by the frequency response of the system, which is influenced by many factors, including the mass, damping, and friction of the moving parts of the system. The system includes the user object and any mechanical linkages used to implement the motion of the user object.

Figure 8:
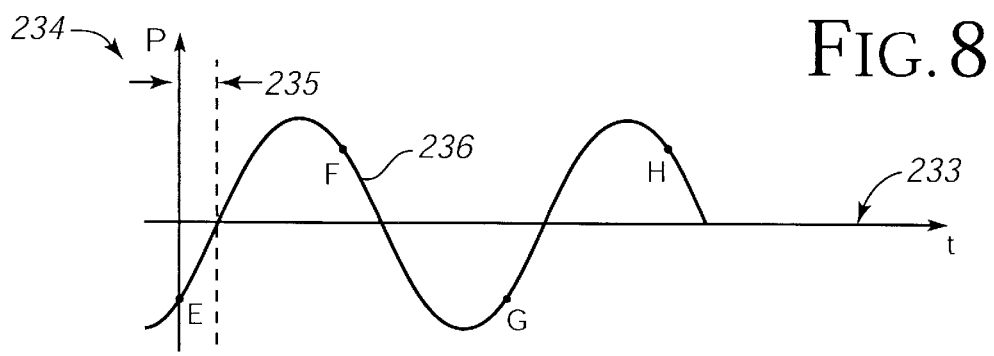
FIG. 8 is a graph showing a position waveform sensed by the sensors during the vibration force of FIG. 6 and including a time lag and the first sampling filtering method of the present invention.
Figure 9:
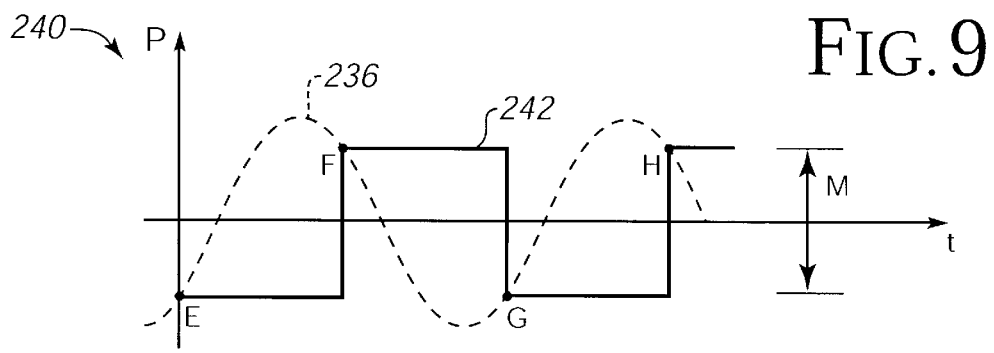
FIG. 9 is a graph showing a reported position waveform filtered from the position waveform of FIG. 8 using the first sampling filtering method.

An example of time lag is shown in the graph 234 of FIG. 8, which illustrates a sensed waveform 236 input to the microprocessor in response to force waveform 218 output on user object 34 having substantially the same frequency and phase as the waveform 232. Time lag 235 causes waveform 236 to be slightly out of phase with the input force waveform 218. Thus, when microprocessor 26 begins sampling the waveform 236 at the same time the force waveform 218 is output, the points E, F, G, and H are sampled. When the microprocessor reports points E, F, G, and H to the host computer 12, the host computer receives the square waveform 242 shown in the graph 240 of FIG. 9 which is based on the reported data points. Waveform 242 has an amplitude of M, which may be small enough in some cases to cause the cursor 202 to only be moved a small amount and thus effectively reduce the disturbance.

However, since the time lag depends on the frequency response of the system and may differ at different frequencies of the output force waveform 218, the points E, F, G, and H may vary and may cause the waveform received by the host computer to vary in amplitude and/or frequency for different types and frequencies of vibrations. The present invention provides two methods to provide the host computer with a more constant filtered position waveform.

Figure 10:
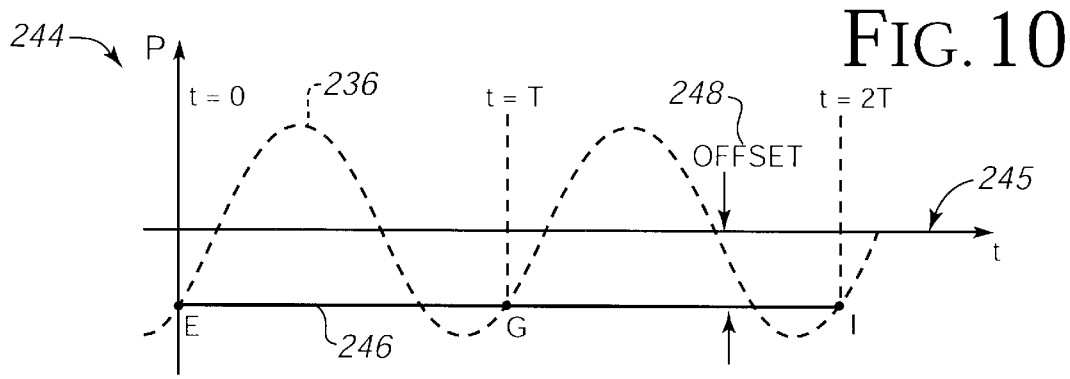
FIG. 10 is a graph showing a reported position waveform filtered from the position waveform of FIG. 8 using a second sampling filtering method of the present invention.

The first method is illustrated in graph 244 of FIG. 10 and causes the filter to report positions of the user object only at multiples of the period of the waveform 236. For example, the sensed waveform 236 of FIG. 8 is shown as a dotted line, and point E is sampled at t=0, point G is sampled at point t=T, point I is sampled at point t=2T, etc. The host computer thus receives a linear waveform 246 formed by these points which is offset from the baseline position 245 by the offset 248.

The offset 248 causes the host computer to display the cursor slightly offset from a displayed position that corresponds to the baseline position 245. Depending on the shape and phase of the sensed waveform 236, the offset 248 can be as small as zero and as large as the peak or trough of the waveform 236. In practice, the offset 248 is often unnoticeable by the user, unless the offset is large enough, as in rare cases, to cause the cursor to be displayed a large distance from the screen position corresponding to the baseline position of the user object. However, since the user object 34 is vibrating, the user cannot precisely determine where the baseline position is and often will not notice even large offsets.

Figure 11:
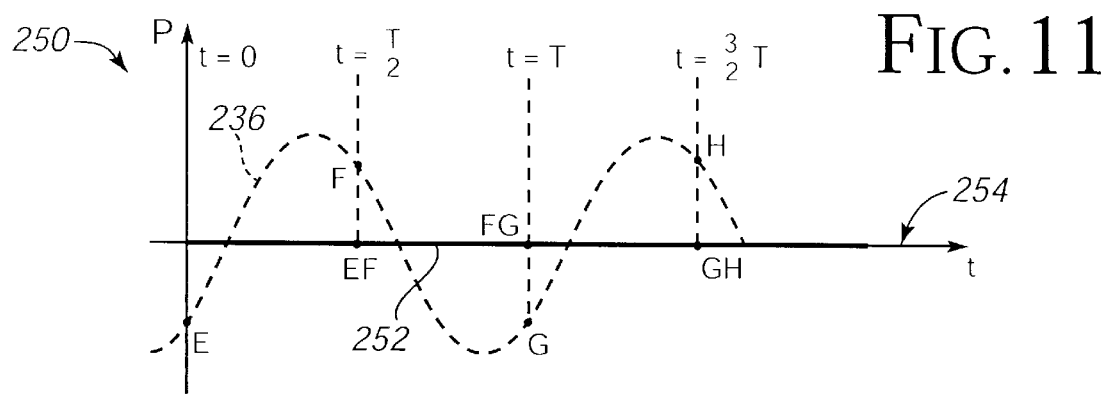
FIG. 11 is a graph showing a reported position waveform filtered from the position waveform of FIG. 8 using an averaging filtering method of the present invention.

The second time-filtering method is illustrated in graph 250 of FIG. 11, which includes time-averaging sampled points of the sensed waveform and reporting the average to the host computer. Preferably, each consecutive pair of sampled points is averaged to create an average data point. For example, points E, F, G, and H are sampled by microprocessor 26 from the input waveform 236 every half period, as in FIG. 8. The microprocessor averages the positions of a pair of points and reports the average to the microprocessor, and does the same for each pair of sampled points. For example, point EF is the average position of points E and F, point FG is the average of points F and G, and point GH is the average of points G and H. The resulting reported waveform 252 is a linear waveform provided substantially at the baseline position 254, resulting in no disturbance movement of cursor 202 on display screen 20. This method tends to provide a filtered waveform much closer to the reported data resulting from ideal waveform 232 of FIG. 7.

The time average filter discussed above can also average multiple points as specified in a time average window. For example, the filter might cause the microprocessor to store a predetermined number of sampled data points in local memory 27 as specified by the window, starting with the point corresponding to the beginning of the output vibration. Initially, until the microprocessor has read in and stored the required number of points, the current or latest received data point can be reported to the host; or, the microprocessor can average all the points it currently has stored and report that averaged value. Once the microprocessor has read in and stored the predetermined number of points, the microprocessor would then average these points and report the averaged value. The window would then be moved over a different set of data points, those points would be averaged, and the average reported. For example, the window can be moved over by one data point so that the first point of the last average is dropped and the next received point is included in the average. Or, the window might be moved over a greater number of data points in other embodiments.

Typically, the more points that are averaged, the better filtering is accomplished. However, averaging a greater number of points slows down the process and burdens the microprocessor 26. Therefore, only a number of points should be averaged that is adequate to reduce a particular disturbance to the desired degree. In the preferred embodiment, the window averaging filter is configurable by a host command, as discussed in greater detail with respect to FIG. 17. Such configurability allows a programmer to adjust the time average filtering as desired for a specific application or effect. The programmer can adjust the number of points that are averaged to optimize the filtering in view of the reduction of the disturbance and the processing burden on the microprocessor 26.

FIG. 12a is a graph 255 illustrating a sensed position waveform 256 that includes influences of an output vibration force as well as a user force on the position of the user object. In a typical case, the user will oppose or assist an output force on the user object since the user is grasping the object and providing his or her own forces on the object. The user forces affect the shape of the sensed position waveform. In waveform 256, the user forces on the user object cause a large deviation 257 in the position of the user object. In addition, the vibration forces output on the user object by actuators 30 cause a sensed vibration waveform to ride on top of the user-induced deviation 257, causing the oscillation of waveform 256. The vibration has a much greater frequency than the slower user-induced forces, and thus is superimposed on the user forces. Since the user-induced position changes are much slower than the vibration-induced position changes, the vibration waveform may be filtered using the time disturbance filters of the present invention without filtering or modifying the user-induced deviation 257. FIG. 12b shows a filtered position waveform 258 derived from waveform 256 and reported to the host computer. Filtered waveform 258 includes deviation 257 but is much "flatter" due to the filtering of the vibration oscillations. This effectively reduces the vibration disturbance while allowing the host to accurately display the graphical object based on user influences of the user object.

It should be noted that vibration forces and other period forces output by the actuators 30 should have a relatively high frequency to allow filtering of locative data without much noticeable effect to the user. Filtering of locative data caused by periodic forces having a low frequency tend to be more noticeable and may affect the shaped of the large deviation 257 as shown. Typically, the user can compensate for forces of low frequency without the need for disturbance filters.

Figure 13:
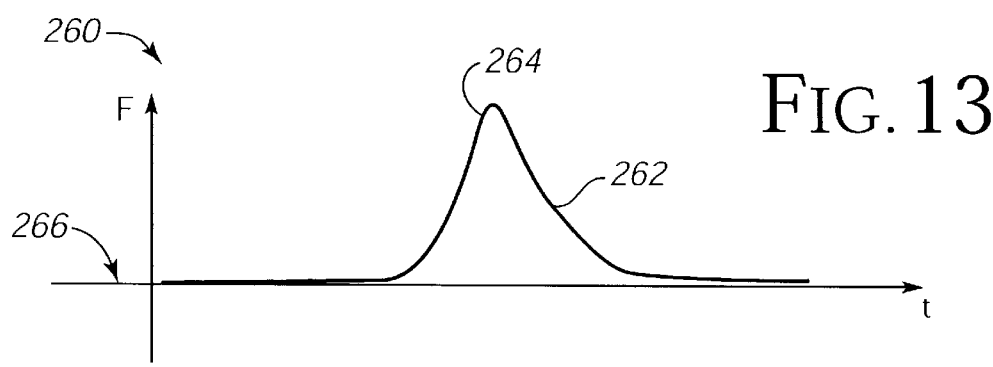
FIG. 13 is a graph showing a force waveform causing an impulse force on the user object.

The sample-and-hold disturbance filter of the present invention operates differently than the time disturbance filters discussed above. FIG. 13 is a graph 260 illustrating an impulse force waveform 262 over time that is output by actuators 30 on user object 34 as controlled by microprocessor 26. The impulse force is a short pulse of force on the user object that causes a jolt sensation to the user. Such jolts can be used in force feedback applications to inform the user of regions or objects in a graphical environment, to inform the user of events in a graphical environment or application program (e.g., a controlled simulated car hits a bump in the road), to simulate a recoil of simulated gun or other instrument, etc. The force is increased sharply from a baseline 266 up to a peak 264, and then reduced again sharply (or gradually) down to zero. Other types of impulse waveforms may also be provided which have different rates of force increase and decrease.

FIG. 14 is a graph 268 illustrating a position waveform 270 indicating the position of user object 34 in a degree of freedom in reaction to the application of force waveform 262 by actuators 30. The user object is jarred in a particular direction by the jolt as indicated by peak 272. A lag is indicated similarly to the lag of FIG. 8.

The sample and hold disturbance filter of the present invention samples a position of the user object 34 before the impulse force waveform 262 is applied, and holds that position value to be reported to the host computer during the duration of the impulse (and possibly after the impulse if appropriate, e.g. to filter momentum effects). For example, the microprocessor may receive a host command from the host computer to initiate a jolt immediately, where a sample-and-hold disturbance filter was previously commanded by the host. The microprocessor samples a position J of the user object before applying the jolt, where position J is at the baseline position of the user object, and stores this position value for later use in, for example, local memory 27. The microprocessor then outputs the impulse force waveform 262 to the actuators 30, which apply the jolt force to the user object 34. The sensors 28 sense and input the waveform 270 of user object positions to the microprocessor 26. However, during the time that the impulse is present, the microprocessor continues to report a position of point J from memory 27 to the host computer. When the impulse is over, such as at point K, the microprocessor stops reporting position J using the sample-and-hold filtering and resumes reporting the actual position of the user object as sensed by the sensors 28. This results in a reported waveform 273 as indicated by the dashed line to be reported to the host, thus preventing the cursor or other user-controlled graphical object/entity to be displayed at a constant position during the jolt.

The sample-and-hold filtering is readily applicable to locative data influenced by a jolt force caused in video games for recoil effects related to user-controlled guns or other weapons, or similar simulated events. For example, the recoil force on a joystick may cause the user to awkwardly shift the joystick in an undesired direction, throwing off the aim of successive shots of the gun. Although this effect may be desired in some games or difficulty levels, in others it is not desired. The sample-and-hold filter greatly reduces this disturbance to the user's aim.

It should be noted that other filtering methods other than sample-and-hold filtering can also be used to minimize the disturbance created by an impulse or jolt effect such as waveform 262. For example, a weighted average value can be determined by the microprocessor using the position value stored in memory and a current value reported by the sensors 28. For example, the average between point J and each point of waveform 270 can be determined and reported to the host computer. An example of such a technique is shown in FIG. 15 in graph 274, where resulting waveform 276 is reported to the host computer. This method reduces the magnitude and effect of the disturbance but does not eliminate it completely.

The third type of filter discussed herein is the spatial disturbance filter. One type of force feedback disturbance suitable for the spatial disturbance filter is the "snap-overshoot" disturbance. This disturbance occurs when the user object 34 is forced or attracted to a particular location corresponding to a location on the display screen, such as by a spring force or an attractive force.

FIG. 16 is an illustration of display screen 20 displaying GUI 200 and illustrates one use of the spatial disturbance filter. An icon 212 is displayed which may be selected by the user with cursor 202 to execute an associated program. In the described example, icon 212 has an attractive force associated with it, where cursor 202 and user object 34 are attracted to a center point P of the icon 212 when the cursor 202 and user object 34 are inside an attractive field perimeter 280. Other graphical objects can also be associated with such an attractive force, such as a button, item in a pull-down menu, a slider bar, a picture on a web page, a column in a spreadsheet, a line of text, or a single character of text in a document. The attractive force and its implementation is described in greater detail in co-pending patent applications Ser. No. 08/571,606 and U.S. Pat. No. 5,959,613, both incorporated by reference herein. The user object 34 (e.g. mouse 214) is forced in a direction 284 by actuators 30, which causes cursor 202 to move in a direction 282 towards the center P of the icon 212. This attractive force is desired at this stage since it helps the user position the cursor 202 toward icon 212.

A common, undesired effect of the attractive force illustrated in FIG. 16 is an overshoot of the cursor 202 past icon 212. For example, the force on mouse 214 is removed or reduced abruptly by the microprocessor 26 when the tip of cursor 202 is on (or is substantially close to) point P; however, the inertia resulting from movement of the mouse causes the mouse 214 to continue moving past point P. This, in turn, causes cursor 202 to move past point P, since the microprocessor 26 usually reports all movement of the user object 34 to the host computer so that the host computer can update the location of cursor 202 in the graphical environment. This is a visual disturbance since the user wants the cursor to be positioned on icon 212, not to move past the icon.

This overshoot disturbance also occurs in other situations in a graphical environment implementing force feedback. For example, a spring force can be associated with a graphical object to cause a force proportional to a spring constant on the user object, and may cause the overshoot disturbance.

These disturbance situations are naturally suited to be filtered by the spatial disturbance filter of the present invention. The spatial disturbance filter can allow the cursor 202 to track the user manipulatable object 212 until the cursor is located at or within a predetermined range of center point P of icon 212. However, when the user object 34 continues past the point P and icon 212, the microprocessor 26 filters the sensed data so that the cursor 202 remains positioned on icon 212. For example, an overshoot range 286 can be designated around point P, as shown by the dashed line. Once the user object moves past an equivalent position of the perimeter of range 286, the microprocessor continues to report to the host computer the last position of the user object 34 that was in the range 286. This effectively removes the overshoot disturbance since the host computer will continue to display the cursor 202 within range 286 even though the user object 34 has overshot the icon 212. In some embodiments, instead of reporting the last position in the range 286, the microprocessor can simply report the center point P of the icon 212. This causes the host computer 12 to display the cursor 202 at the exact center of the icon during an overshoot, like a snap to the center effect.

In some cases, the user object and cursor may never be moved into the range 286. For example, the cursor may be moved next to the icon 212 but inertia may move the user object away from the icon 212. In such an example, the microprocessor can continue to report the closest position of user object 34 to icon 212 while the user object overshoots the icon. In such a case, the user object should be very close to the icon so that the microprocessor can reasonably assume that the icon is the intended target of the user.

In a preferred embodiment, the microprocessor will continue to report this last-sensed position of user object 34 in range 286 until one or more predetermined conditions occur, at which time the microprocessor resumes reporting the actual position of the user object to the host computer. For example, three conditions can be checked; if any of these conditions occur, reporting of actual position resumes. A first condition is that the user object 34 is moved back within range 286 within a predetermined time period. This movement back into range 286 is typically caused by the attractive force associated with the icon and might also be assisted by the user. A second condition is that the user object is moved past a predetermined outer overshoot range away from the icon 212. Such movement may indicate that the user does not actually want to move cursor 202 onto icon 212 and wants the overshoot to occur, e.g., a different target past the icon 212 is the intended target for the cursor. This outer overshoot range can be that same as the perimeter 280 of the attractive force in some embodiments, or may be a different range. A third condition may be a time duration after the spatial disturbance filter is applied; once the time duration expires, the reporting of actual position automatically resumes. These conditions can be specified as desired by the GUI program, an application program, user, interface device manufacturer, or other source. A host command can be provided from the host computer to specify the conditions and/or other characteristics of the spatial disturbance filter, as described below.

It should be noted that other types of disturbance filters can also be used instead of or in addition to the spatial disturbance filter to remove or reduce an overshoot disturbance. For example, a time disturbance filter as described with reference to FIGS. 7–12 can be combined with the spatial disturbance filter to reduce the overshoot effect rather than eliminate it. The microprocessor, for example, can store the last position of the user object 34 within overshoot range. As the user object overshoots the range 286, the microprocessor can average the current position of the user object with the last stored position and report the resulting averaged position to the host computer. Thus, a reduced overshoot disturbance of the cursor 202 would be displayed by the host computer, which may be desired in some cases to more accurately reflect the position of the user object yet still reduce the disturbance.

Commanding and Implementing Selective Disturbance Filters

The selective force disturbance filters described herein are well suited for use with the architecture of interface device 14 described with respect to FIGS. 1 and 4. Preferably, microprocessor 26 performs the filtering in conjunction with its control of output forces. This is an efficient implementation since the microprocessor can filter data reported back to the host computer based on and in correlation with the force feedback sensations being generated on the user object. In addition, the host computer 12 need not directly control or implement any filter-related functions and thus may dedicate its computational resources to the implementation of the graphical environment and the high-level command of force feedback. Also, the host computer does not perform and is ignorant of any filtering functions; in fact, the host can be completely unaware that the filtering is happening and simply update the application program based on reported data. This allows any application programs running on the host to make use of the filters of the present invention without having specific filter functionality incorporated into the programs.

Figure 17:
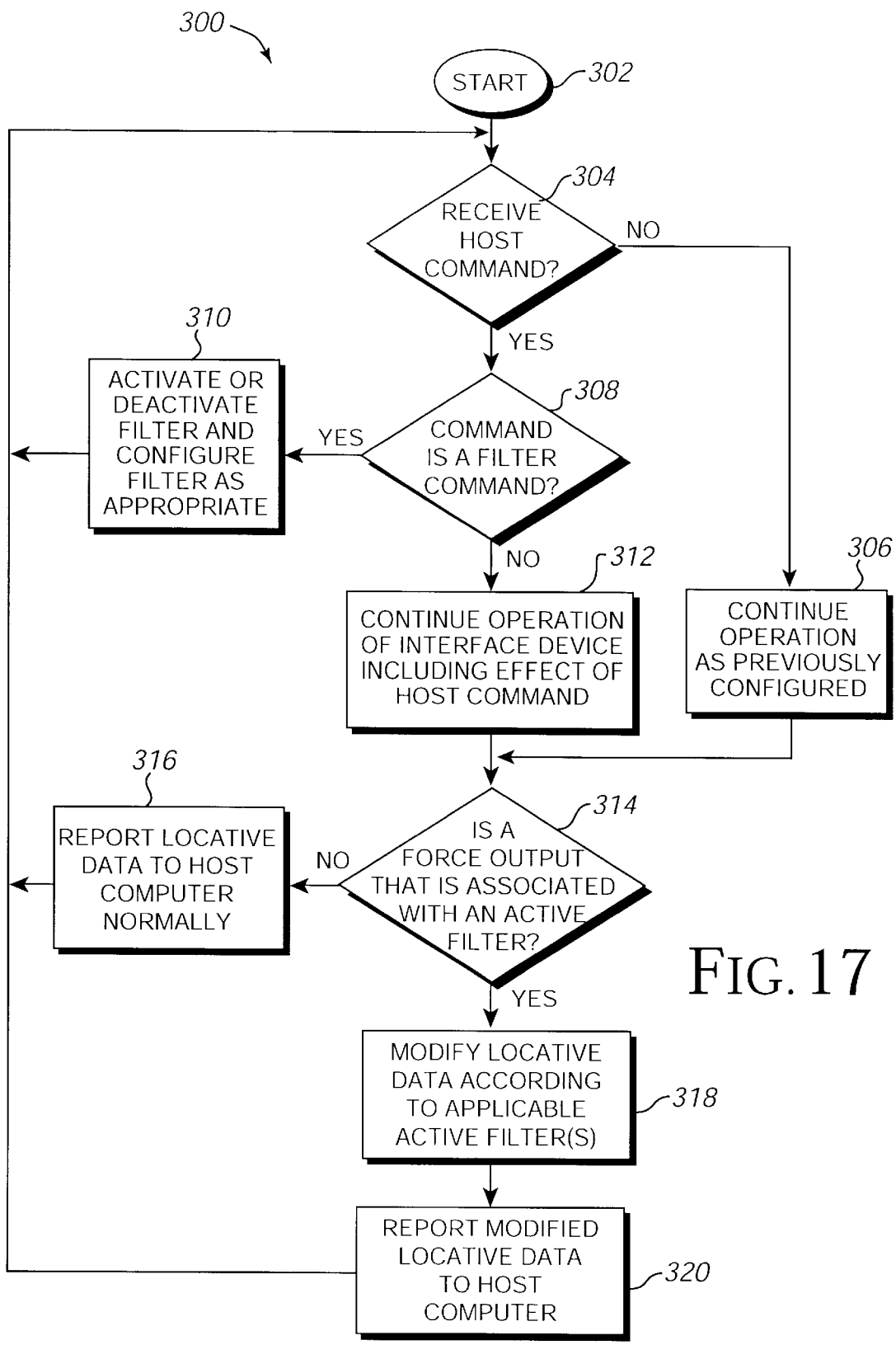
FIG. 17 is a flow diagram illustrating a method of implementing the selective disturbance filters of the present invention.

In the preferred embodiment, the disturbance filtering of the present invention may be controlled at a high level through the use of host commands. FIG. 17 is a flow diagram illustrating one example of a simplified method 300 for controlling filters through the use of host commands. The process can be implemented on microprocessor 26 and be implemented through the use of software (e.g. program instructions) stored in memory 27 or other computer readable medium, in hardware, or in a combination of hardware and software. As referenced herein, a "computer readable medium" includes by way of example memory such as RAM and ROM coupled to host computer 12 or processor 26, magnetic disks, magnetic tape, optically readable media such as CD ROMs, semiconductor memory such as PCM-CIA cards, etc. In each case, the medium may take the form of a portable item such as a small disk, diskette, cassette, etc., or it may take the form of a relatively larger or immobile item such as a hard disk. It should be noted that although the steps of method 300 are shown in a sequential fashion, the steps can be performed in parallel by the microprocessor or host computer. Also, the steps might be implemented in different ways; for example, step 304 can be performed by polling the bus for host commands, or by providing interrupts for reception of the host commands.

The process begins at 302, and in step 304, the microprocessor checks whether a host command has been received from the host computer. If not, the microprocessor continues operation of the force feedback device in step 306 according to a previous configuration. This operation includes outputting forces on user object 34 by actuators 30 when appropriate, reading sensor signals from sensors 28 (and other input devices 39), and reporting data to the host computer 12. For example, any host commands previously received and which are still in effect might influence the outputting of forces and inputting of sensor signals. Also, any previous disturbance filters still active may affect the reporting of data, as explained below. The process continues to step 314 after step 306, as described below.

If a host command is received in step 304, the microprocessor in step 308 checks whether the host command is a filter command, i.e., whether the command activates, deactivates, or configures a disturbance filter of the present invention (a single received command can, in some cases, configure other functionality besides the filter, such as forces, a location of a graphical object, etc.). If it is a filter command, in step 310 the process activates, deactivates or configures the filter as appropriate to the command. After step 310, the process returns to step 304 (or the process continues to step 312 if other non-filter functionality is instructed by the command).

For example, host commands preferably include a command identifier and one or more commands parameters, as discussed above with reference to FIG. 4. The disturbance filtering can be characterized and configured based on these host command identifiers and parameters. For example, commands can specify the type of disturbance which is to be filtered and the characteristics of the filtering process. Commands such as Filter_Jolt and Filter_Vibration can be commanded by the host to filter these specific disturbances. Alternatively, a more generic host command, such as "Filter" can be provided, where a type of disturbance that is to be filtered (jolt, vibration, etc.) is specified as a parameter. In addition, the host command can have a command identifier or a command parameter specifying the type of filter, e.g., a time sampling filter, a time-averaging filter, a sample-and-hold filter, or a spatial filter, or a combination of two or more of these. Parameters can specify the characteristics of the filters, such as duration (for all types of filters), range or distance (for spatial filters), a minimum frequency vibration at which the filter is to be applied (for time filters), the number of samples to be averaged in a time window and the duration of the time window in which that number of time samples is taken (time averaging filter), sampling rate for a time filter, etc. For example, a time average window can be specified as sampling 50 data points within a 50 millisecond window. Alternatively, a command to output a force effect or other function can include disturbance filter parameters that activate or configure a filter.

Spatial filters can also be configured and activated/deactivated using host commands. For example, when the host computer 12 sends a command to the microprocessor to implement an attractive force at an origin point P for an icon (or other graphical object), that command can include parameters for activating or deactivating a spatial filter associated with that attractive force, as well as parameters designating the overshoot range and outer overshoot range (if applicable) any time duration associated with the spatial filtering, and any other parameters. Alternatively, the spatial filter can be commanded by a separate spatial filter command that refers to a specific, previously-commanded attractive force. The previously-commanded atttractive force can be identified by the location that the attractive force is applied in the graphical environment.

A host command can be used to activate (enable) or deactivate (disable) a filter. When activating (enabling) a filter, the host command causes microprocessor 26 to execute a filter routine or process stored in memory 27 or other accessible storage. The microprocessor will then monitor host commands and user object position to determine when the activated filter should be applied, and apply the filter under appropriate conditions. An activation of a filter, for example, can be initiated by simply sending a filter command with no parameters; or, a parameter of a filter command, such as "on", can activate a filter. A host command might also cause a filter to activate at some specified time in the future or under specified conditions. Similarly, a host command can deactivate an active disturbance filter. When a deactivate command is received, the microprocessor searches any active filters that match the filters that are commanded to be deactivated, and deactivates those filters, e.g. will not apply the filter.

If the received host command is not a filter command in step 308 (or after the filter portion of the command is processed in step 310), the process continues to step 312, in which the microprocessor continues the implementation of the force feedback interface device including the effect of the received host command (if appropriate). Thus, the microprocessor would continue to output force commands and read sensor signals according to a previous configuration and taking into account the effect of the new host command. Thus, if the host command caused a button to be associated with a newly-specified force, the microprocessor would apply that newly-specified force when the user presses that button. If the received host command causes a jolt to be immediately output, the microprocessor outputs the appropriate force.

In next step 314, the process checks whether a force is output in step 312 that is associated with an active filter. For example, for time and sample-and-hold filters, the microprocessor can monitor the force that is about to be executed and determine if any associated filters are active. The microprocessor knows when a periodic force is about to be output, and will associate an active filter with the periodic force if the active filter has been configured to apply to period forces (or vibrations) by a host command. For spatial filters, the microprocessor can monitor when locally-generated force sensations are caused to be output due to interaction of the cursor/user object with graphical objects. The microprocessor can examine whether the graphical objects interacted with are associated with any active filters, as specified by previously-loaded host commands (or otherwise previously specified).

In addition, step 314 preferably includes checking whether a filter should be applied even if the forces to be output may not be specifically associated with a filter. For example, such a situation may occur if a filter is assigned a specific time duration during which all input locative data is filtered. For example, the user object may have a momentum caused by an output force and which moves the user object after the output force has ended. The host computer may output a command to the microprocessor specifying a filter to have a duration that is longer than the force's duration to make sure that any such momentum of the user object which occurs after the output force is filtered. A host command might specify a filter that has a 5-second duration, where the host computer knows that several different forces will be output during this 5-second time period. It is more efficient to command one filter during this time period rather than enabling and disabling the filter for each different force.

If a force is commanded by the microprocessor does not have an active filter associated with it (and a filter should not otherwise be applied), then the locative data resulting from the output forces is reported normally to the host computer in step 316, i.e., no disturbance filter is applied to the locative data. In this step, the microprocessor may process the raw sensor signals received from the sensors into locative data suitable for reception by the host computer, but no disturbance filter is applied to the data. Also, any data from other input devices 39 may also be reported in this step. The process then returns to step 304. If an output force is associated with an active filter(s (or a filter(s) should be applied for a different reason), then in step 318, the locative data is modified according to the associated filter(s). For example, a time disturbance filter, sample-and-hold filter, and/or spatial filter is applied to the locative data as described previously. In some cases, multiple filters can be applied to locative data. For example, a jolt can be output at the same time a vibration is begun. A sample and hold filter can modify the initial locative data in which the jolt disturbance dominates the effect on the user object, followed by a time filter which modifies the locative data following the jolt that is affected by the vibration disturbance.

In next step 320, the microprocessor 26 reports the modified locative data to the host computer 12. The host computer typically uses the reported locative data to update the position of a user-controlled graphical object in a displayed graphical environment. Other data from input devices 39 can also be reported to the host computer in this step. The process then returns to step 304.

In alternate embodiments not having a local microprocessor 26, the host computer 12 can perform the disturbance filtering of the present invention before displaying objects based on data received from sensors 28. Such filtering is useful in any embodiment to eliminate or reduce the disturbance to the user caused by output force sensations on the user object.

While this invention has been described in terms of several preferred embodiments, it is contemplated that alterations, permutations and equivalents thereof will become apparent to those skilled in the art upon a reading of the specification and study of the drawings. For example, many different types of forces that cause disturbances can be associated with filters specifically designed for those forces or generically designed to reduce disturbances caused by multiple types of forces. The filters can be commanded, characterized, and implemented in many ways by the host computer and microprocessor of the force feedback interface device. Furthermore, certain terminology has been used for the purposes of descriptive clarity, and not to limit the present invention. It is therefore intended that the following appended claims include all such alterations, permutations, and equivalents as fall within the true spirit and scope of the present invention.

What is claimed is:

1. A force feedback interface device implementing a selective disturbance filter for reporting filtered data to a host computer system, said host computer system implementing and displaying a graphical environment, the interface device comprising:

a user manipulatable object physically contacted by a user and movable in physical space in a degree of freedom with respect to a ground;

a sensor operative to detect said movement of said user manipulatable object in physical space in said degree of freedom with respect to said ground and output sensor signals representative of said movement;

an actuator coupled to said user manipulatable object and operative to apply an output force in said degree of freedom of said user manipulatable object; and a microprocessor, separate from said host computer, coupled to said sensor and to said actuator, said microprocessor operative to receive host commands from said host computer and output force signals to said actuator to control said output force on said user manipulatable object, and operative to receive said sensor signals from said sensors and report locative data to said host computer derived from said sensor signals and indicative of said movement of said user manipulatable object, said host computer updating a graphical environment based on at least a portion of said locative data, wherein said microprocessor implements a selective disturbance filter for modifying said locative data reported to said host computer when said output force causes said user manipulatable object to move and would cause an undesired change in position of said user manipulatable object to be reported to said host computer if said modification of said locative data were not performed.

2. A force feedback interface device as recited in claim 1 wherein said selective disturbance filter is associated with at least one force sensation controlled by said microprocessor, such that said selective disturbance filter modifies said reported data only when said associated force sensation is output by said actuator.

3. A force feedback interface device as recited in claim 2 wherein a plurality of different types of force sensations can be commanded by said microprocessor to be output by said actuator, and wherein said at least one of said different types of force sensations can be commanded by said host computer by providing a host command to said microprocessor, wherein said selective disturbance filter is activated by said host computer by providing a host command.

4. A force feedback interface device as recited in claim 3 wherein said modifying of said locative data is performed if said output force sensation is associated with said selective disturbance filter that has previously been commanded to be active by said host computer.

5. A force feedback interface device as recited in claim 3 wherein at least one of a plurality of available selective disturbance filters may be used to modify said locative data.

6. A force feedback interface device as recited in claim 1 wherein said modification of said locative data includes sampling said locative data over time according to a sampling rate, and reporting only said sampled locative data to said host computer.

7. A force feedback interface device as recited in claim 1 wherein said modification of said locative data includes time-averaging said locative data and reporting said averaged data to said host computer.

8. A force feedback interface device as recited in claim 1 wherein said modification of said locative data includes sampling and holding a data value derived from said sensor signals before said force sensation is output, wherein said held data value is reported to said host computer during said force sensation.

9. A force feedback interface device as recited in claim 1 wherein said modification of said locative data includes using a spatial filter to sample and hold a data value derived from said sensor signals, said data value representing a last position of said user manipulatable object before said user object is moved out of a predetermined region in said graphical environment.

10. A force feedback interface device as recited in claim 1 wherein said different types of force sensations include a vibration that causes a disturbance of a vibrating cursor when said reported locative data is not modified.

11. A force feedback interface device as recited in claim 10 wherein said different types of force sensations include a jolt that causes a disturbance of a cursor that is suddenly moved in a direction corresponding to said jolt when said reported locative data is not modified.

12. A method for selectively filtering visual disturbances associated with forces occurring in a force feedback system, the method comprising:

enabling a reception of a command at a force feedback interface device from a host computer to output a force sensation on a user manipulatable object of said force feedback interface device;

enabling a determination of whether said force sensation is associated with a disturbance filter process stored in a computer readable medium;

enabling a determination of whether said associated disturbance filter process is enabled;

enabling a filtering of input data according to said associated disturbance filter process to provide filtered input data, said filtering being performed if said associated disturbance filter process is enabled, said input data being received from sensors during said output of said force sensation and being representative of a position of said user manipulatable object in a degree of freedom, wherein said filtered input data is substantially free of a disturbance on said user manipulatable object caused by said output of said force sensation; and enabling a report of said filtered input data to said host computer, said host computer using at least part of said filtered data to update a displayed graphical environment.

13. A method as recited in claim 12 further comprising enabling a reception of a command from said host computer to enable said associated disturbance filter process.

14. A method as recited in claim 12 wherein said filtered data is used by said host computer to position a cursor in a graphical environment.

15. A method as recited in claim 12 wherein said force sensation is one of a plurality of different available force sensations that may be output by said force feedback interface device, wherein at least two of said force sensations are associated with different disturbance filter processes.

16. A method for selectively decoupling an input channel from an output channel in a force feedback interface device by filtering input data, the method comprising:

outputting a force sensation in a degree of freedom of a user manipulatable physical object of said force feedback interface device, said force sensation being correlated with an event in a graphical environment implemented by a host computer coupled to said force feedback interface device;

determining whether said force sensation is associated with a disturbance filter process stored in memory of said force feedback device;

filtering input data according to said associated disturbance filter process to reduce a visual disturbance in said graphical environment caused by said output of said force sensation, said input data being received from sensors during said output of said force sensation and being representative of a position of said physical object in said degree of freedom; and using said filtered input data to update said displayed graphical environment.

17. A method as recited in claim 16 further comprising determining whether said associated disturbance filter process is active, and performing said filtering only if said associated disturbance filter process is active.

18. A method as recited in claim 17 further comprising receiving a command from a host computer coupled to said force feedback interface device to activate said associated disturbance filter process.

19. A method as recited in claim 18 wherein said outputting of said force sensation is commanded by said host computer using a host command.

20. A method as recited in claim 16 wherein a plurality of disturbance filter processes are stored in said memory, and wherein said force sensation is one of a plurality of different available force sensations that may be output by said force feedback interface device, wherein at least two of said force sensations are associated with different ones of said disturbance filter processes.

21. A method for selectively decoupling an input channel from an output channel in a force feedback interface device by filtering input data, the method comprising:

enabling an output of a force sensation in a degree of freedom of a user manipulatable physical object of said force feedback interface device, said force sensation being correlated with an event in a graphical environment implemented by a host computer coupled to said force feedback interface device;

enabling a determination of whether said force sensation is associated with a disturbance filter process stored in memory of said force feedback device;

enabling a filtering of input data according to said associated disturbance filter process to reduce a visual disturbance in said graphical environment caused by said output of said force sensation, said input data being received from sensors during said output of said force sensation and being representative of a position of said physical object in said degree of freedom; and enabling a update of said displayed graphical environment using said filtered input data.

22. A method as recited in claim 21 wherein a plurality of disturbance filter processes are stored in said memory, and wherein said force sensation is one of a plurality of different available force sensations that may be output by said force feedback interface device, wherein at least two of said force sensations are associated with different ones of said disturbance filter processes.

23. A method for reducing disturbances in input data from a force feedback device, the method comprising:

enabling an output of a force sensation from a force feedback device; and enabling a filtering of said input data according to a disturbance filter process associated with said force sensation to provide filtered input data, said input data being received from at least one sensor of said force feedback device during said output of said force sensation and being representative of movement of said user manipulatable object in a degree of freedom, wherein said filter input data is substantially free of a disturbance on said movement of said user manipulatable object caused by said output of said force sensation.

24. A method as recited in claim 23 wherein at least part of said filtered input data is used to update a displayed graphical environment.

25. A method as recited in claim 24 wherein a position of a graphical object in said graphical environment is updated using said filtered input data.

26. A method as recited in claim 23 further comprising enabling a report of said filtered input data to a host computer in communication with said force feedback device.

27. A method as recited in claim 24 wherein said enabling an output of a force sensation and a said enabling a filtering of said input data is performed by a processor local to said force feedback device and separate from a host computer in communication with said force feedback device.

28. A method as recited in claim 24 wherein said enabling an output of a force sensation and said enabling a filtering of input data is performed by a driver running on a host computer in communication with said force feedback device.

29. A method as recited in claim 23 wherein said disturbance filter process can be enabled or disabled, and wherein said filtering is performed if said associated disturbance filter process is enabled.

30. A method as recited in claim 23 wherein said force sensation is output by at least one actuator of said force feedback device, and wherein said output of said force sensation is correlated with an event in said graphical environment implemented by a host computer in communication with said force feedback device.

31. A method as recited in claim 23 wherein said disturbance filter process modifies said input data only when said associated force sensation is output by said force feedback device.

32. A method as recited in claim 23 wherein said disturbance filter process modifies said input data by sampling said input data over time according to a sampling rate, and using only said sampled input data as said filtered input data.

33. A method as recited in claim 23 wherein said disturbance filter process modifies said input data by time-averaging said input data and reporting said using said time-averaged data as said filtered input data.

34. A method as recited in claim 23 wherein said disturbance filter process modifies said input data by sampling and holding a data value derived from said input data before said force sensation is output, wherein said held data value is used as said filtered input data.

35. An apparatus implementing a selective disturbance filter for filtering data used in displaying objects in a computer-implemented graphical environment, the apparatus comprising:

means for causing an output of a force sensation from a force feedback device; and means for filtering said input data according to a disturbance filter process associated with said force sensation to provide filtered input data, said input data being received from at least one sensor of said force feedback device during said output of said force sensation and being representative of movement of a user manipulatable object of said force feedback device in a degree of freedom, wherein said filtered input data is substantially free of a disturbance on said movement of said user manipulatable object caused by said output of said force sensation.

36. An apparatus as recited in claim 35 wherein said means for filtering includes a processor local to said force feedback device and separate from a host computer.

37. An apparatus as recited in claim 35 wherein said means for filtering is included in a driver running on a host computer in communication with said force feedback device.

38. An apparatus as recited in claim 35 wherein said force feedback device includes a sensor operative to detect said movement of said user manipulatable object in physical space in said degree of freedom and output sensor signals representative of said movement.

39. An apparatus as recited in claim 35 wherein said disturbance filter process modifies said input data by sampling said input data over time according to a sampling rate, and using only said sampled input data as said filtered input data.

40. An apparatus as recited in claim 35 wherein said disturbance filter process modifies said input data by time-averaging said input data and reporting said using said time-averaged data as said filtered input data.

41. An apparatus as recited in claim 35 wherein at least part of said filtered input data is used to update a displayed graphical environment.

42. An apparatus as recited in claim 41 wherein a position of a graphical object in said graphical environment is updated using said filtered input data.

43. An apparatus as recited in claim 35 wherein said force sensation is correlated with an event in said graphical environment implemented by a host computer coupled to said force feedback device.

* * * * *